US010951557B2

(12) United States Patent
Lu et al.

(10) Patent No.: US 10,951,557 B2
(45) Date of Patent: Mar. 16, 2021

(54) INFORMATION INTERACTION METHOD AND TERMINAL

(71) Applicant: Tencent Technology (Shenzhen) Company Limited, Shenzhen (CN)

(72) Inventors: Yi Lu, Shenzhen (CN); Suhyun Lee, Shenzhen (CN); Tat Hei Wong, Shenzhen (CN); Zehan She, Shenzhen (CN); Tingjun Hong, Shenzhen (CN); Qian Zhang, Shenzhen (CN); Jin Fang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 458 days.

(21) Appl. No.: 15/218,452

(22) Filed: Jul. 25, 2016

(65) Prior Publication Data
US 2016/0337279 A1    Nov. 17, 2016

Related U.S. Application Data

(63) Continuation of application No. PCT/CN2015/081442, filed on Jun. 15, 2015.

(30) Foreign Application Priority Data

Jun. 18, 2014    (CN) .......................... 201410273443.8

(51) Int. Cl.
*H04L 12/58*    (2006.01)
*H04L 29/08*    (2006.01)
(Continued)

(52) U.S. Cl.
CPC ............ *H04L 51/046* (2013.01); *G06F 3/167* (2013.01); *H04L 29/08* (2013.01); *H04L 51/10* (2013.01);
(Continued)

(58) Field of Classification Search
CPC ....... H04L 51/046; H04L 51/10; H04L 29/08; H04W 4/21; H04W 4/12; H04W 4/16; G06F 3/167
(Continued)

(56) References Cited

U.S. PATENT DOCUMENTS 5,467,448 A * 11/1995 Hilton ................... G06F 17/211
715/235
8,887,300 B1 * 11/2014 Gates ...................... H04L 63/10
713/168
(Continued)

FOREIGN PATENT DOCUMENTS

CN    101075983 A    11/2007
CN    101406752 A    4/2009
(Continued)

OTHER PUBLICATIONS

International Search Report issued in corresponding International Application No. PCT/CN2015/081442, dated Sep. 18, 2015 (2 pages).
(Continued)

*Primary Examiner* — John T Repsher, III
(74) *Attorney, Agent, or Firm* — Brinks Gilson & Lione

(57) ABSTRACT

An information interaction method is applied to a first terminal installed with an interaction program, the first terminal is connected to a second terminal installed with a voice player and a lighting device, and the method includes: acquiring, by the first terminal, at least one type of interaction information of voice information, text information and expression information and at least one interaction effect of a sound effect and a lighting effect that are corresponding to the interaction information; and sending acquired effect data
(Continued)

(1)

(2)

to the second terminal according to the interaction information and the interaction effect, the second terminal displaying the effect data.

11 Claims, 20 Drawing Sheets

(51) Int. Cl.
    *H04W 4/16*       (2009.01)
    *H04W 4/21*       (2018.01)
    *G06F 3/16*        (2006.01)
    *H04W 4/12*       (2009.01)

(52) U.S. Cl.
    CPC ............... *H04W 4/12* (2013.01); *H04W 4/16* (2013.01); *H04W 4/21* (2018.02)

(58) Field of Classification Search
    USPC ........................................................ 715/728
    See application file for complete search history.

(56) References Cited

U.S. PATENT DOCUMENTS

| | | | | |
|---|---|---|---|---|
| 2006/0015560 A1* | 1/2006 | MacAuley | ............... | A63F 13/12 709/206 |
| 2008/0195652 A1* | 8/2008 | Um | ........................ | G06Q 10/10 |
| 2010/0114579 A1* | 5/2010 | Ostermann | ............. | G10L 13/08 704/260 |
| 2010/0122167 A1 | 5/2010 | Ryu | | |
| 2011/0044324 A1 | 2/2011 | Li et al. | | |
| 2011/0320553 A1* | 12/2011 | Wu | ................... | H04L 29/06027 709/206 |
| 2013/0033422 A1 | 2/2013 | Choi et al. | | |
| 2013/0040611 A1* | 2/2013 | Rega | ................. | H04M 1/72566 455/413 |
| 2013/0305164 A1* | 11/2013 | Karunamuni | ........ | G06Q 10/107 715/752 |
| 2013/0339859 A1* | 12/2013 | Hardi | ...................... | G06F 3/016 715/728 |
| 2015/0067538 A1* | 3/2015 | Lee | ......................... | G06F 9/451 715/753 |
| 2015/0248563 A1* | 9/2015 | Alfarano | ............. | H04L 12/1831 726/27 |
| 2016/0345412 A1* | 11/2016 | Aggarwal | .......... | H05B 37/0227 |

FOREIGN PATENT DOCUMENTS

| | | |
|---|---|---|
| CN | 101610465 A | 12/2009 |
| CN | 101742018 A | 6/2010 |
| CN | 102158543 A | 8/2011 |
| CN | 102847325 A | 1/2013 |

OTHER PUBLICATIONS

International Preliminary Report on Patentability issued in corresponding International Application No. PCT/CN2015/081442, dated Dec. 20, 2016 (4 pages).

Chinese Office Action in corresponding Chinese Application No. 2014102734438, dated Oct. 10, 2018 (7 pages).

* cited by examiner (1)

(2)

(3)

INFORMATION INTERACTION METHOD AND TERMINAL

CROSS REFERENCE TO RELATED APPLICATIONS

This application is a continuation of International Application No. PCT/CN2015/081442, filed on Jun. 15, 2015, which claims the benefit of priority to Chinese Patent Application No. 201410273443.8, filed on Jun. 18, 2014. The entire disclosures of each of the above-identified applications are incorporated herein by reference in their entirety.

FIELD OF THE TECHNOLOGY

The present disclosure relates to the field of information technologies, and in particular, to an information interaction method and terminal

BACKGROUND OF THE DISCLOSURE

With the continuous development of information technologies, application scenarios of information interaction increase. For example, information interaction may be applied to a scenario of children education, to increase parent-children interaction and convenience and enjoyment of communication. Therefore, how to perform information interaction becomes an issue concerned by people.

Currently, when performing information interaction, two terminals need to be separately installed with an App (application) that supports an intercom function, and after the App is opened, the two terminals need to be connected via Bluetooth. After the two terminals are connected successfully, information interaction may be performed. In the information interaction process, one terminal acquires voice information, and sends the acquired voice information to the other connected terminal, and the other terminal plays the voice information.

During an implementation process of the present disclosure, the inventor found that the foregoing method has at least the following problems:

Because when the foregoing method is used to perform information interaction, two interacted terminals need to be separately installed with an App that supports an intercom function, and interacted information is voice information, the foregoing information interaction manner has certain limitations, and the interaction manner is relatively single, which are adverse to the application of information interaction.

SUMMARY

According to a first aspect, an information interaction method is provided, the method being applied to a first terminal installed with an interaction program, the first terminal being connected to a second terminal installed with a voice player and a lighting device, and the method including:
  acquiring, by the first terminal, interaction information, the interaction information including at least one type of voice information, text information and expression information;
  acquiring an interaction effect corresponding to the interaction information, the interaction effect being at least one of a sound effect and a lighting effect;
  acquiring effect data according to the interaction information and the interaction effect; and
  sending the effect data to the second terminal, the second terminal displaying the effect data.

According to another aspect, an information interaction terminal is provided, the terminal being installed with an interaction program, the terminal being connected to a second terminal installed with a voice player and a lighting device, and the terminal including:
  a first acquiring module, configured to acquire interaction information, the interaction information including at least one type of voice information, text information and expression information;
  a second acquiring module, configured to acquire an interaction effect corresponding to the interaction information, the interaction effect being at least one of a sound effect and a lighting effect;
  a third acquiring module, configured to acquire effect data according to the interaction information and the interaction effect; and
  a first sending module, configured to send the effect data to the second terminal, the second terminal displaying the effect data.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions and advantages of the present disclosure clearer, the following describes in further detail implementation manners of the present disclosure with reference to the accompanying drawings.

Figure 1:
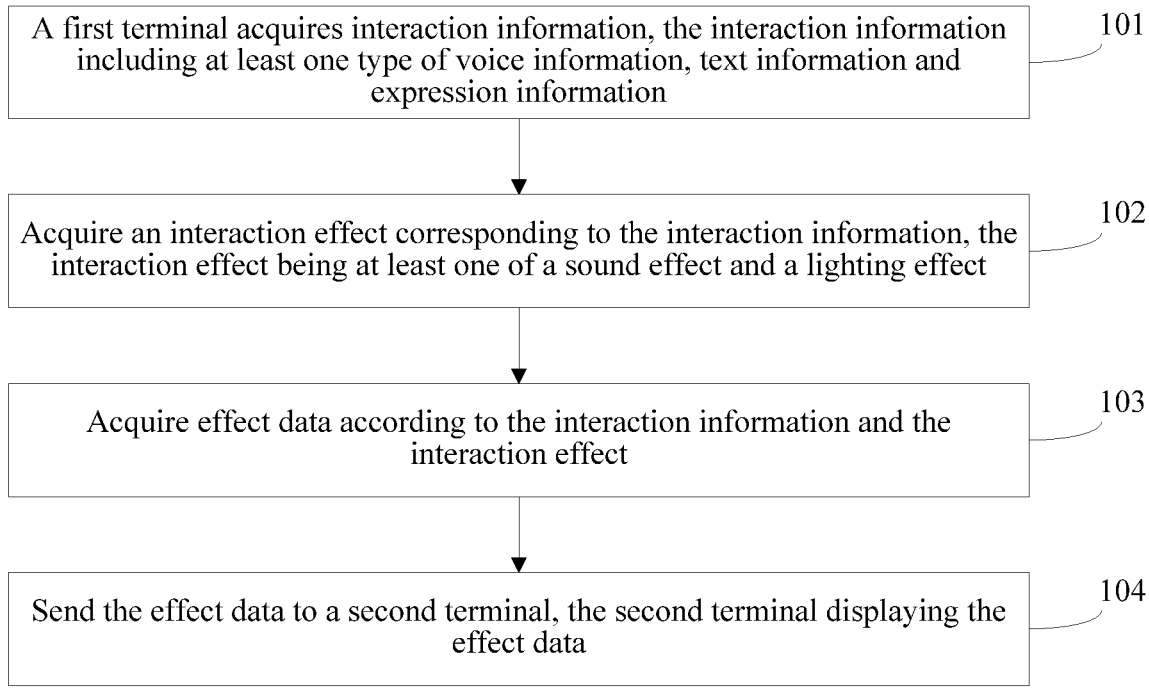
FIG. 1 is a flowchart of an information interaction method according to an embodiment of the present invention.

To extend information interaction manners, and enrich categories of interaction information, an embodiment of the present invention provides an information interaction method. Using an example from a perspective that a first terminal installed with an interaction program executes the method provided in this embodiment of the present invention, and the first terminal is connected to a second terminal installed with a voice player and a lighting device. Referring to FIG. 1, a process of the method includes:

101: A first terminal acquires interaction information, the interaction information including at least one type of voice information, text information and expression information.

As an optional embodiment, the acquiring interaction information includes:
  a sound recording instruction, and displaying a sound recording interface according to the sound recording instruction; and
  acquiring voice information input in the sound recording interface, and using the voice information as the acquired interaction information.

As an optional embodiment, the acquiring interaction information includes:
  detecting text input instruction, and displaying a text input interface according to the text input instruction; and
  acquiring text information input in the text input interface, and using the text information as the acquired interaction information.

As an optional embodiment, the acquiring interaction information includes:
  detecting an expression input instruction, and displaying an expression selection interface according to the expression input instruction; and
  acquiring selected expression information in the expression interface, and using the selected expression information as the acquired interaction information.

102: Acquire an interaction effect corresponding to the interaction information, the interaction effect being at least one of a sound effect and a lighting effect.

As an optional embodiment, the acquiring an interaction effect corresponding to the interaction information includes:
  displaying, by the first terminal, an interaction interface, the interaction interface displaying at least one optional interaction effect of a sound effect and a lighting effect; and
  detecting a selected interaction effect, and using the selected interaction effect as an interaction effect corresponding to the interaction information, the selected interaction effect being at least one.

103: Acquire effect data according to the interaction information and the interaction effect.

As an optional embodiment, the acquiring effect data according to the interaction information and the interaction effect includes:
  the voice information according to the interaction effect to obtain the effect data.

As an optional embodiment, the acquiring effect data according to the interaction information and the interaction effect includes:
  processing the text information according to the interaction effect to obtain the effect data.

As an optional embodiment, the acquiring effect data according to the interaction information and the interaction effect includes:
  obtaining the effect data according to the selected expression information and the interaction effect.

104: Send the effect data to a second terminal, the second terminal displaying the effect data.

As an optional embodiment, after the sending the effect data to the second terminal, the method further includes:
  detecting a use record acquiring instruction, and sending a use record acquiring request to the second terminal according to the use record acquiring instruction; and
  receiving a use record that is returned by the second terminal according to use the record acquiring request and is corresponding to the first terminal.

As an optional embodiment, the method further includes:
  receiving voice information sent by the second terminal, and playing the voice information.

As an optional embodiment, before the receiving voice information sent by the second terminal, the method further includes:
  receiving a sound recording request sent by the second terminal; and
  determining whether to accept the sound recording request; and
  returning a sound recording instruction to the second terminal if it is determined to accept the sound recording request; and
  the receiving voice information sent by the second terminal includes:

receiving the voice information that is acquired by the second terminal according to the sound recording instruction.

Figure 2:
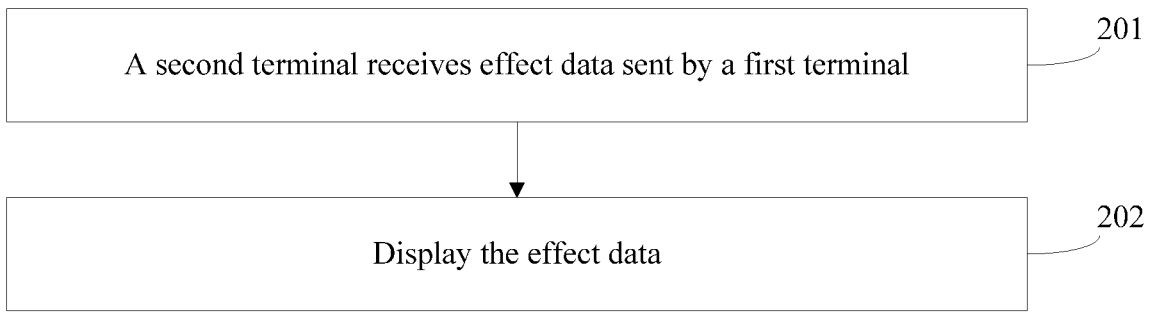
FIG. 2 is a flowchart of an information interaction method according to another embodiment of the present invention.

Using an example from a perspective that a second terminal installed with a voice player and a lighting device executes the method provided in this embodiment of the present invention, and the second terminal is connected to a first terminal installed with an interaction program. Referring to FIG. 2, a process of the method includes:

201: A second terminal receives effect data sent by a first terminal.

202: Display the effect data.

The effect data is obtained by the first terminal according to the acquired interaction information and the acquired interaction effect. The interaction information includes at least one type of voice information, text information and expression information, the interaction effect is an interaction effect corresponding to the interaction information, and the interaction effect is at least one of a sound effect and a lighting effect.

As an optional embodiment, the displaying the effect data includes:

controlling, according to the effect data, the voice player to play a corresponding sound effect and/or a lighting device to display a corresponding lighting effect.

As an optional embodiment, after the displaying the effect data, the method further includes:

receiving a use record acquiring request sent by the first terminal; and searching, according to the use record acquiring request, for a use record corresponding to the first terminal, and returning the use record to the first terminal.

As an optional embodiment, the method further includes:

acquiring voice information, and sending the voice information to the first terminal, the first terminal playing the voice information.

As an optional embodiment, before the acquiring voice information, the method further includes:

detecting a voice acquiring instruction, and sending a sound recording request to the first terminal according to the voice acquiring instruction; and receiving a sound recording instruction that is returned by the first terminal according to the sound recording request; and the acquiring voice information includes:

acquiring the voice information according to the sound recording instruction.

In the method provided in this embodiment of the present invention, interaction information and an interaction effect corresponding to the interaction information are acquired by using a first terminal, then effect data is acquired according to the interaction information and the interaction effect, the effect data is sent to a second terminal, and the second terminal displays the effect data. Only one interacted terminal installed with an interaction program is needed to implement information interaction, the interaction information is at least one type of voice information, text information and expression information, and the interaction effect is at least one of a sound effect and a lighting effect, which enrich information interaction manners.

Figure 3:
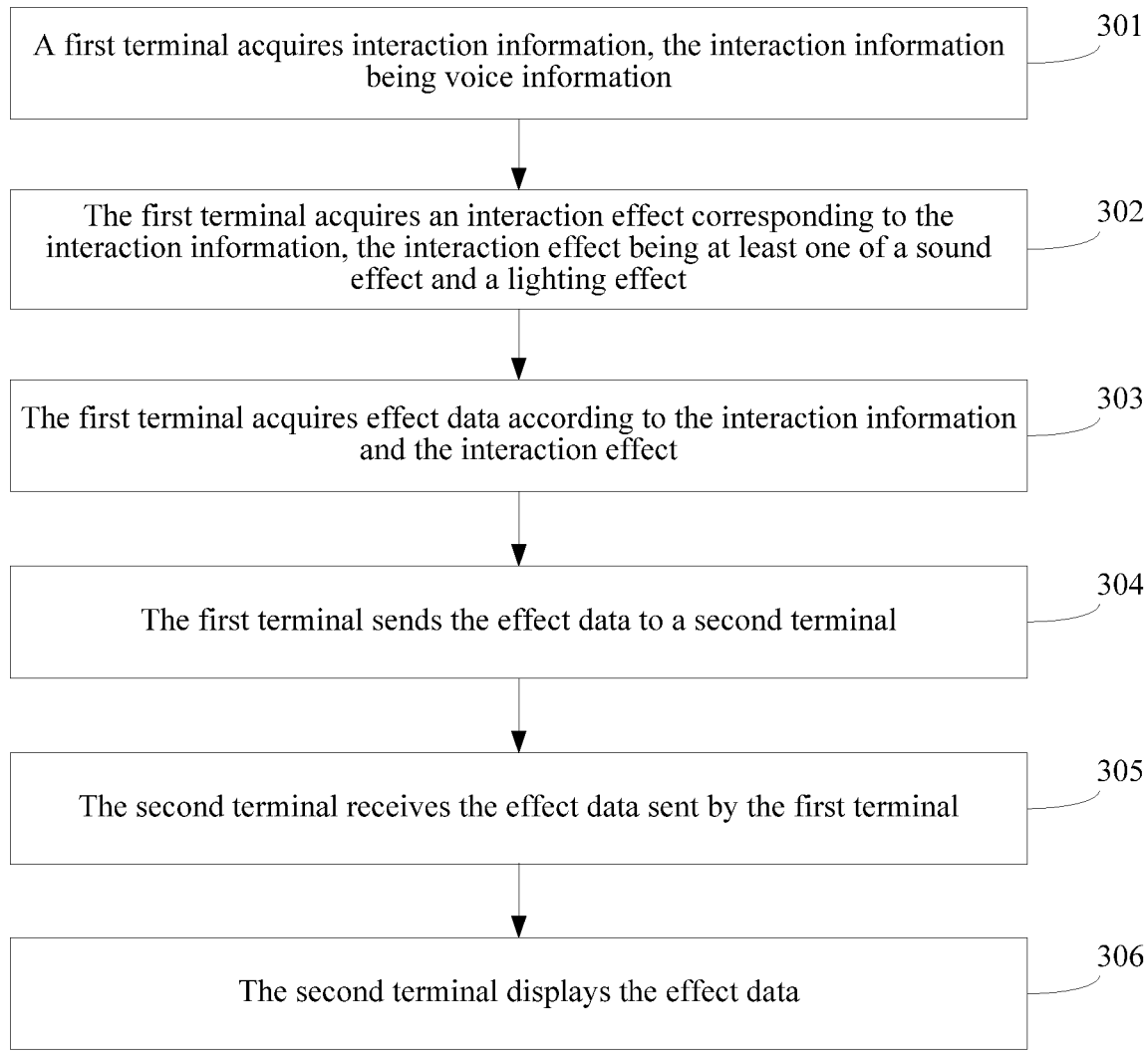
FIG. 3 is a flowchart of an information interaction method according to another embodiment of the present invention.

An embodiment of the present invention provides an information interaction method, where the method is applied to a first terminal installed with an interaction program, and a second terminal that is connected to the first terminal and installed with a voice player and a lighting device. With reference to the content of the embodiments shown in FIG. 1 and FIG. 2, because the interaction information includes at least one type of voice information, text information and expression information, the acquiring an interaction effect corresponding to the interaction information has multiple cases. For ease of description, in this embodiment, using the interaction information being voice information as an example, the method provided in this embodiment of the present invention is explained and described in detail. Referring to FIG. 3, a process of the method includes:

301: A first terminal acquires interaction information, the interaction information being voice information.

The first terminal includes but is not limited to an intelligent terminal that may be installed with an interaction program, such as a mobile phone, and a tablet computer. A first terminal acquiring interaction information includes but is not limited to:

detecting, by the first terminal, a sound recording instruction, and displaying a sound recording interface according to the sound recording instruction; and acquiring, by the first terminal, voice information input in the sound recording interface, and using the voice information as the acquired interaction information.

The manner for detecting a sound recording instruction is not specifically limited in this embodiment. During specific implementation, an interaction interface may be displayed, and a sound recording button may be displayed on the interaction interface. If it is detected that the sound recording button is clicked, a sound recording instruction is detected. Certainly, apart from the foregoing manner, a voice instruction may also be detected, and whether the voice instruction is a sound recording instruction is determined; and if the voice instruction is the sound recording instruction, the sound recording instruction is detected.

Further, the displaying a sound recording interface according to the sound recording instruction may be displayed in a form of a sound recording icon, and this embodiment does not limit the manner for displaying the sound recording interface. The displayed sound recording interface is corresponding to a recordable device such as a microphone in the first terminal, so that the first terminal may acquire the voice information input in the sound recording interface, and use the voice information as the acquired interaction information.

Figure 4:
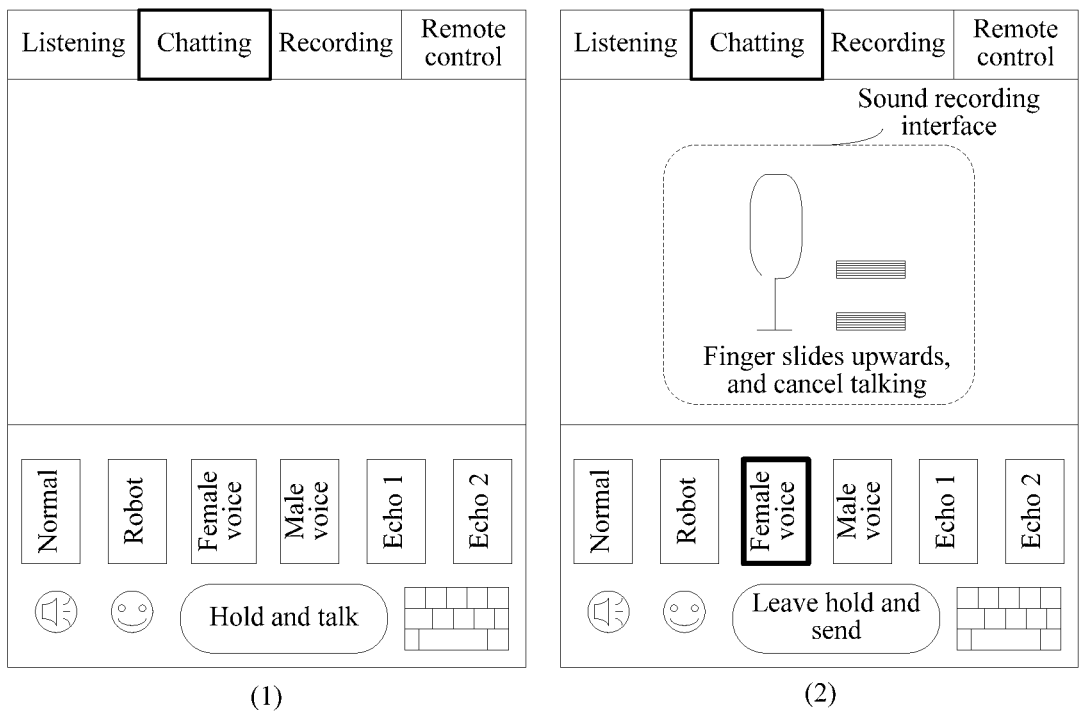
FIG. 4 is a schematic diagram of an interaction interface according to another embodiment of the present invention.

For ease of understanding, using the interaction interface shown in FIG. 4(1) as an example for description, the interaction interface displays a sound recording button, namely, a "hold and talk" button. If it is detected that the "hold and talk" button is clicked, a sound recording instruction is detected; a sound recording interface displayed according to the sound recording instruction is a sound recording icon, and the "hold and talk" button changes to a "leave hold and send" button, as shown in FIG. 4(2); by displaying the sound recording interface, a user learns voice information that may be input currently, that is, a user learns that voice information may be input by using the sound recording interface. When it is detected that the "leave hold and send" button is not clicked, voice input of the sound recording interface is stopped, and the voice information that is input in the sound recording interface and acquired by the first terminal is voice information input by the user during the period in which the "hold and talk" button is clicked, so that the voice information input by the user is used as the acquired interaction information.

302: The first terminal acquires an interaction effect corresponding to the interaction information, the interaction effect being at least one of a sound effect and a lighting effect.

Because the interaction information acquired by the foregoing step 301 is voice information, the acquiring an interaction effect corresponding to the interaction information includes but is not limited to:

displaying, by the first terminal, an interaction interface, the interaction interface displaying at least one optional interaction effect of a sound effect and a lighting effect; and detecting, by the first terminal, a selected interaction effect, and using the selected interaction effect as an interaction effect corresponding to the interaction information, the selected interaction effect being at least one.

The manner for the first terminal to display an interaction interface is not specifically limited in this embodiment. Because the first terminal is installed with an interaction program, during specific implementation, the installed interaction program may be started, and the interaction interface may be displayed, where the interaction interface displays at least one optional interaction effect of a sound effect and a lighting effect.

Further, the manner for the first terminal to detect a selected interaction effect is also not specifically limited in this embodiment. During specific implementation, a clicked optional interaction effect may be detected, and the clicked optional interaction effect is used as the detected selected interaction effect. Certainly, apart from the foregoing manner, a voice instruction may also be detected, and a selected interaction effect may be determined according to the voice instruction. After the first terminal detects the selected interaction effect, the selected interaction effect may be used as an interaction effect corresponding to the interaction information.

For ease of understanding, still using the interaction interface shown in FIG. 4(1), an optional interaction effect being a sound effect as an example for description. 6 sound effects: "normal voice", "robot", "female voice", "male voice", "echo 1" and "echo 2", displayed on the interaction interface are used as optional interaction effects. If it is detected that a clicked optional interaction effect is the "female voice", the "female voice" is used as the detected selected interaction effect, and the selected interaction effect is used as an interaction effect corresponding to the interaction information, that is, the interaction effect corresponding to the interaction information is the "female voice", as shown in FIG. 4(2).

303: The first terminal acquires effect data according to the interaction information and the interaction effect.

The manner for the first terminal to acquire the effect data according to the interaction information and the interaction effect is not specifically limited in this embodiment. Because the interaction information acquired in the foregoing step 301 is voice information, the acquiring effect data according to the interaction information and the interaction effect includes but is not limited to:

the voice information according to the interaction effect to obtain the effect data.

For ease of understanding, still using the interaction interface shown in FIG. 4(2) as an example for description, if the interaction effect is the "female voice", and the interaction information is voice information, when the voice information is processed according to the "female voice", audio voice change processing may be performed on the voice information according to the "female voice", to obtain the effect data.

304: The first terminal sends the effect data to a second terminal.

The second terminal includes but is not limited to a terminal installed with a voice player and a lighting device.

As an optional embodiment, when the first terminal sends the effect data to the second terminal, whether the first terminal is connected to the second terminal may be determined, and if the first terminal is not connected to the second terminal, it prompts whether to connect to the second terminal; and if the first terminal is connected to the second terminal, the first terminal may send the effect data to the second terminal. The first terminal may be connected to the second terminal via Bluetooth, or may be connected to the second terminal via Wireless Fidelity (WiFi). This embodiment does not limit the connection manner of the first terminal and the second terminal When the first terminal is connected to the second terminal via WiFi, the first terminal and the second terminal may be connected to same WiFi, or may be connected to different WiFi.

When the first terminal is connected to the second terminal via Bluetooth, the first terminal may directly send the effect data to the second terminal When the first terminal and the second terminal are connected to same WiFi, the first terminal sends the effect data to a router, and the router sends the effect data to the second terminal. When the first terminal and the second terminal are connected to different WiFi, the first terminal sends the effect data to a network server, and the network server sends the effect data to the second terminal. Optionally, the network server may further store the effect data in a database, so that the first terminal subsequently may query the sent effect data in the network server.

Figure 5:
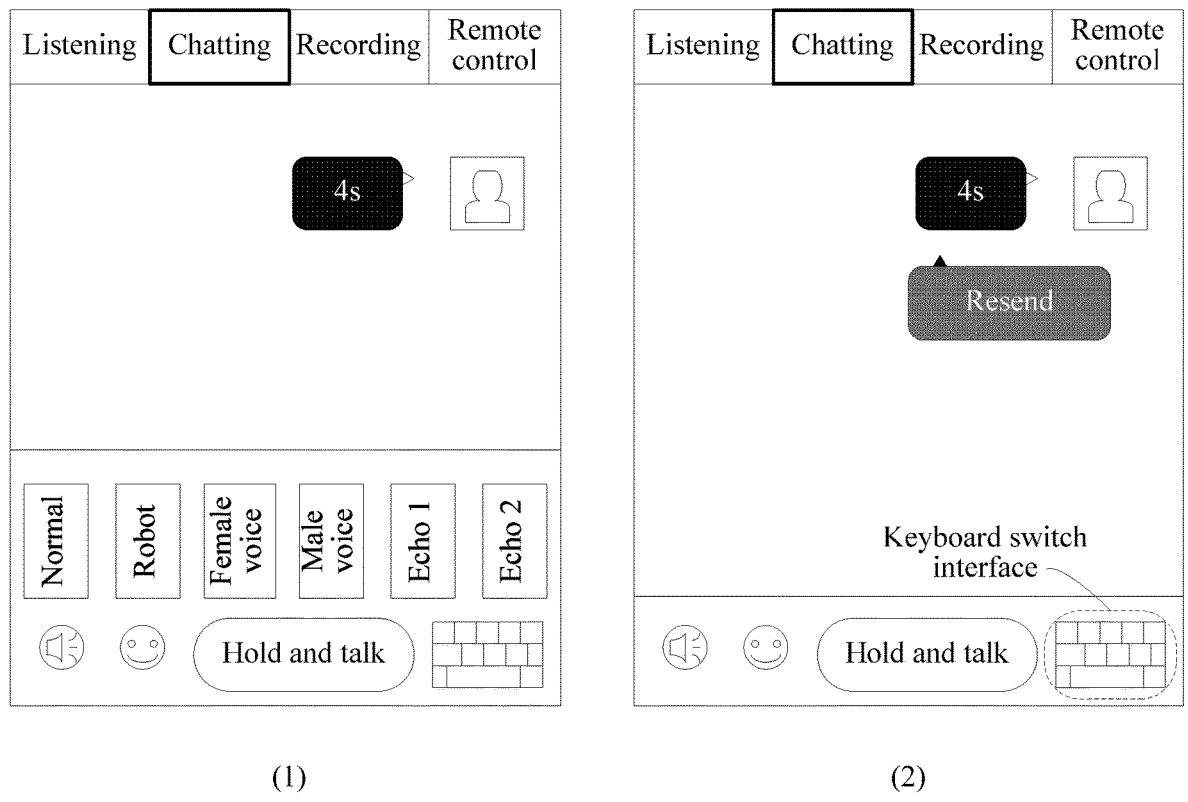
FIG. 5 is a schematic diagram of an interaction interface according to another embodiment of the present invention.

As an optional embodiment, after the first terminal sends the effect data to the second terminal, the interaction interface of the first terminal may further display an identifier corresponding to the sent effect data. Different effect data may be corresponding to different identifiers. Using the interaction effect being the "female voice", and the interaction information being voice information with duration of 4 s (seconds) as an example, an identifier corresponding to the effect data acquired according to the voice information and the "female voice" may be the duration 4 s of the voice information, as shown in FIG. 5(1).

305: The second terminal receives the effect data sent by the first terminal

The manner for the second terminal to receive the effect data sent by the first terminal is not specifically limited in this embodiment. After receiving the effect data sent by the first terminal, the second terminal may perform the subsequent steps.

306: The second terminal displays the effect data.

The manner for the second terminal to display the effect data is not specifically limited in this embodiment. During specific implementation, because an interaction effect corresponding to the interaction information acquired in the foregoing step 302 is a sound effect, the second terminal displaying the effect data includes but is not limited to: the second terminal controls, according to the effect data, a voice player to play a corresponding sound effect.

Optionally, after displaying the effect data successfully, the second terminal may further returns a feedback about the successfully display to the first terminal, so that the first terminal learns a display result of the effect data. If the second terminal does not display the effect data successfully, the second terminal may return a feedback about the unsuccessfully display to the first terminal, so that the first terminal may send the effect data to the second terminal again, and the second terminal receives the effect data sent by the first terminal again, thereby successfully displaying the effect data, and completing information interaction.

Using the interaction interface shown in FIG. 5(1) as an example, if the first terminal receives the feedback about the unsuccessfully display of the effect data, the first terminal may prompt the unsuccessfully display of the effect data on an interaction interface, and after it is detected that an identifier corresponding to the effect data is clicked, a "resend" option is displayed, as shown in FIG. 5(2); if it is detected that the "resend" option is clicked, the first terminal may send the effect data to the second terminal again, that is, perform step 304 again, and the second terminal may receive the effect data sent by the first terminal again, that is, perform step 305 again, and display the effect data.

During actual application, one first terminal may perform information interaction with multiple second terminals, and multiple first terminals may perform information interaction with one second terminal. This embodiment does not limit the number of first terminals and second terminals. No matter the number of first terminals or second terminals is one or more, when the first terminal performs information interaction with the second terminal, the second terminal may further record use records corresponding to different first terminals. A use record corresponding to the first terminal includes but is not limited to information such as the interaction time of the first terminal and the second terminal, and the number of times of interactions. If the second terminal is further installed with a sensor, the use record corresponding to the first terminal may further include the number of times of the sensor being triggered when the first terminal performs information interaction with the second terminal As an optional embodiment, after the second terminal displays the effect data, the method further includes but is not limited to:

detecting, by the first terminal, a use record acquiring instruction, and sending a use record acquiring request to the second terminal according to the use record acquiring instruction;

receiving, by the second terminal, the use record acquiring request sent by the first terminal;

searching, by the second terminal, according to the use record acquiring request, for a use record corresponding to the first terminal, and returning the use record to the first terminal; and receiving, by the first terminal, a use record that is returned by the second terminal according to use the record acquiring request and is corresponding to the first terminal The manner for the first terminal to detect a use record acquiring instruction is not specifically limited in this embodiment. During specific implementation, a use record acquiring button may be provided on an interaction interface. If it is detected that the use record acquiring button is clicked, a use record acquiring instruction is detected. Certainly, apart from the foregoing manner, a voice instruction may further be detected, and whether the voice instruction is the use record acquiring instruction is determined; and if the voice instruction is the use record acquiring instruction, the use record acquiring instruction is detected.

For ease of understanding, still using the interaction interface shown in FIG. 5(1) as an example for description, the interaction interface provides a use record acquiring button, namely, a "record" button. If it is detected that the "record" button is clicked, the use record acquiring instruction is detected.

As an optional embodiment, the use record acquiring request sent to the second terminal by the first terminal according to the use record acquiring instruction may further carry an identifier of the first terminal, so that the second terminal searches, according to the identifier of the first terminal carried in the use record acquiring request, for a use record corresponding to the first terminal.

As an optional embodiment, after the first terminal receives a use record that is returned by the second terminal according to the use record acquiring request and is corresponding to the first terminal, the use record may further be displayed. The manner for displaying the use record is not specifically limited in this embodiment. During specific implementation, the use record may be displayed on the interaction interface. Certainly, apart from the foregoing manner, the use record may also be played by voice.

Figure 6:
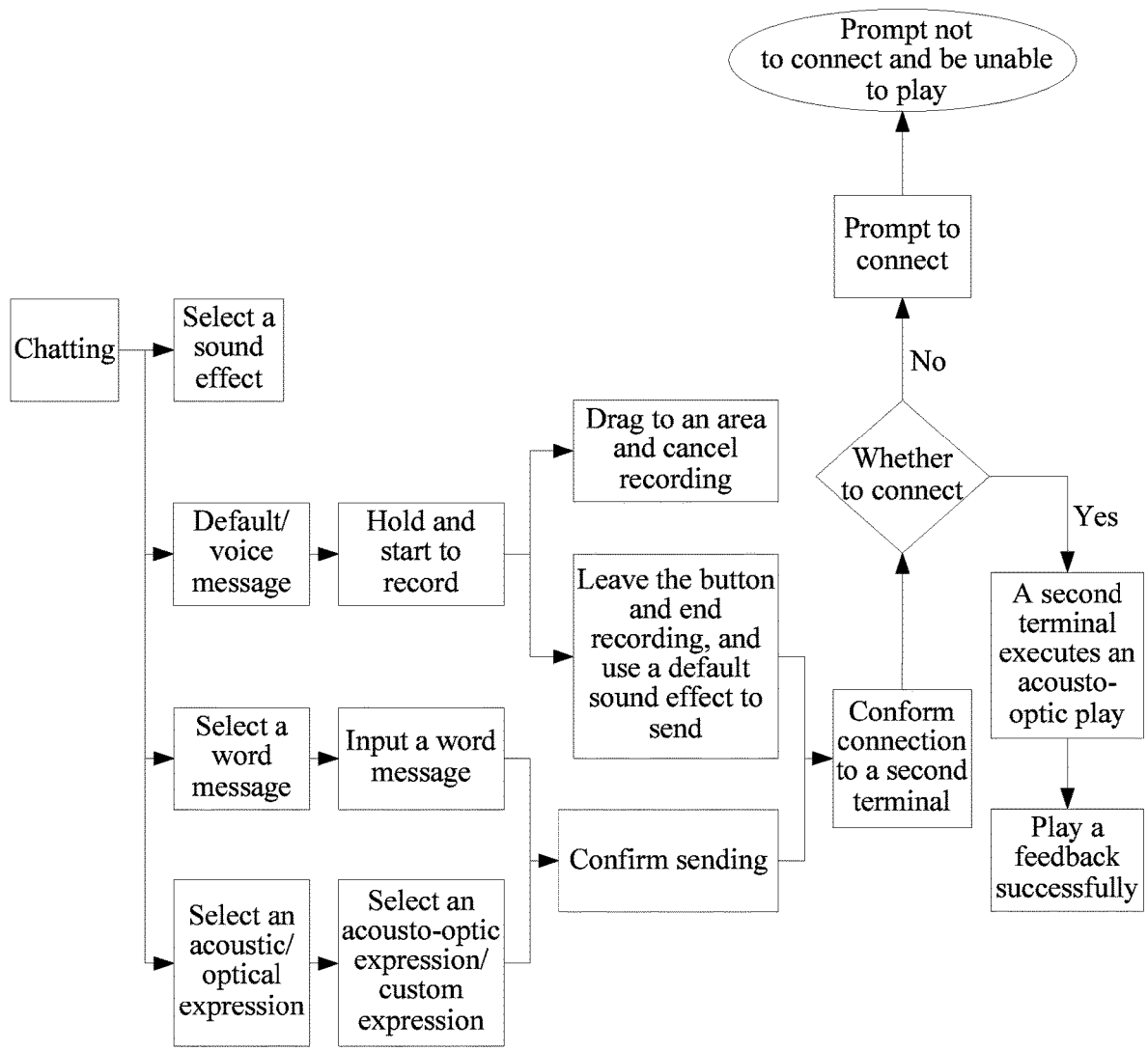
FIG. 6 is a flowchart of an information interaction method according to another embodiment of the present invention.

In addition, referring to the interaction flowchart shown in FIG. 6, step 301 to step 303 are corresponding to chatting, sound effect selecting, a default/voice message, holding and starting to record, dragging to an area to cancel the recording, leaving the button and ending the recording, and sending a default sound effect; step 304 is corresponding to confirming connection to a second terminal, whether to connect, connection prompting, prompting not to connect and being unable to play; and step 305 and step 306 are corresponding to a second terminal executing an acousto-optic play and playing a feedback successfully.

Further, through the foregoing step 301 to step 306, information interaction is completed. To enrich information interaction manners, as an optional embodiment, the method provided in this embodiment further includes but is not limited to:

acquiring, by the second terminal, voice information, and sending the voice information to the first terminal; and receiving, by the first terminal, the voice information sent by the second terminal, and playing the voice information.

The manners for the second terminal to acquire the voice information and the first terminal to receive the voice information sent by the second terminal are not specifically limited in this embodiment.

As an optional embodiment, before the second terminal acquires the voice information, the method further includes but is not limited to:

detecting, by the second terminal, a voice acquiring instruction, and sending a sound recording request to the first terminal according to the voice acquiring instruction;

receiving, by the first terminal, a sound recording request sent by the second terminal;

determining, by the first terminal, whether to accept the sound recording request; and returning, by the first terminal, a sound recording instruction to the second terminal if the first terminal accepts the sound recording request; and receiving, by the second terminal, a sound recording instruction that is returned by the first terminal according to the sound recording request.

The manner for the second terminal to detect a voice acquiring instruction is not specifically limited in this embodiment. During specific implementation, if the second terminal provides a sound recording button, and detects that the sound recording button is clicked, a voice acquiring instruction is detected. Certainly, apart from the foregoing manner, a voice instruction may further be detected, and whether the voice instruction is the voice acquiring instruction is determined; and if the voice instruction is the voice acquiring instruction, the voice acquiring instruction is detected.

Further, the second terminal acquiring the voice information includes but is not limited to: the second terminal acquiring the voice information according to a sound recording instruction. The first terminal receiving the voice information sent by the second terminal includes but is not limited to: the first terminal receiving the voice information that is acquired by the second terminal according to the sound recording instruction.

Figure 7:
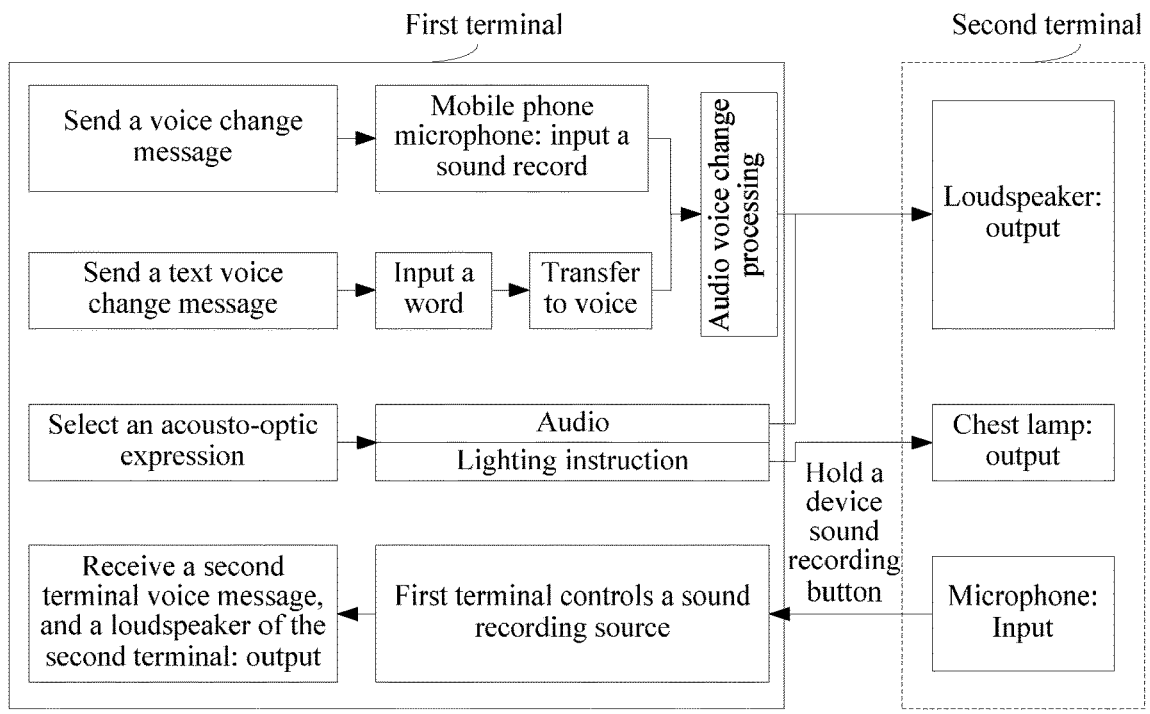
FIG. 7 is a flowchart of an information interaction method according to another embodiment of the present invention.

In addition, referring to the interaction flowchart shown in FIG. 7, step 301 and step 302 are corresponding to sending a voice change message, and a mobile phone microphone: inputting a sound record; step 303 and step 304 are corresponding to audio voice change processing; and step 305 and step 306 are corresponding to a loudspeaker: output, a microphone: input, holding a device sound recording button, a first terminal controlling a sound recording source and receiving a second terminal voice message, and a loudspeaker of the second terminal: output.

Figure 8:
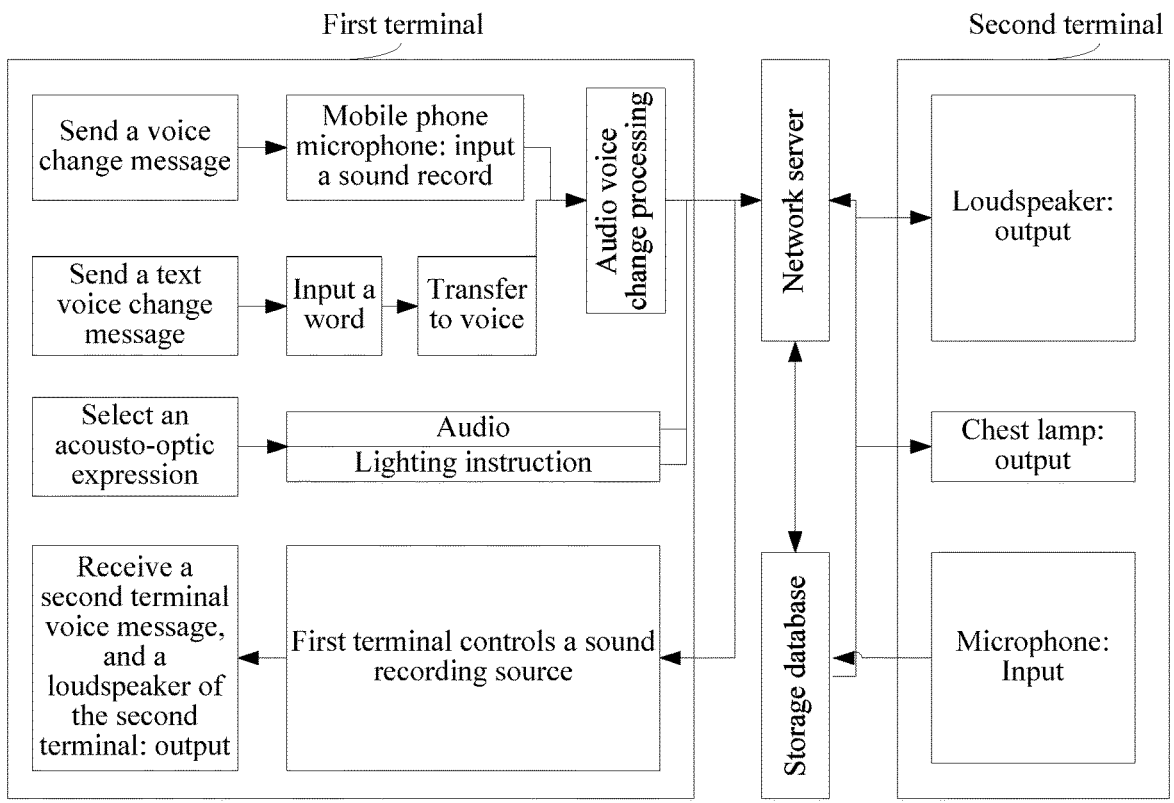
FIG. 8 is a flowchart of an information interaction method according to another embodiment of the present invention.

When the first terminal is connected to the second terminal via WiFi, the interaction process may further be shown in FIG. 8. Step 301 and step 302 are corresponding to sending a voice change message, a mobile phone microphone: inputting a sound record; step 303 and step 304 are corresponding to an audio voice change process, a network server and a storage database; and step 305 and step 306 are corresponding to a loudspeaker: output, a microphone: input, a network server, a storage database, a first terminal controlling sound recording source and receiving a second terminal voice message, and a second terminal loudspeaker: output.

In the method provided in this embodiment of the present invention, interaction information including voice information is acquired by using a first terminal, the interaction information and an interaction effect corresponding to the interaction information are acquired, then effect data is acquired according to the interaction information and the interaction effect, the effect data is sent to a second terminal, and the second terminal displays the effect data. Only one interacted terminal installed with an interaction program is needed to implement information interaction, and the interaction effect is at least one of a sound effect and a lighting effect, which enrich information interaction manners.

Figure 9:
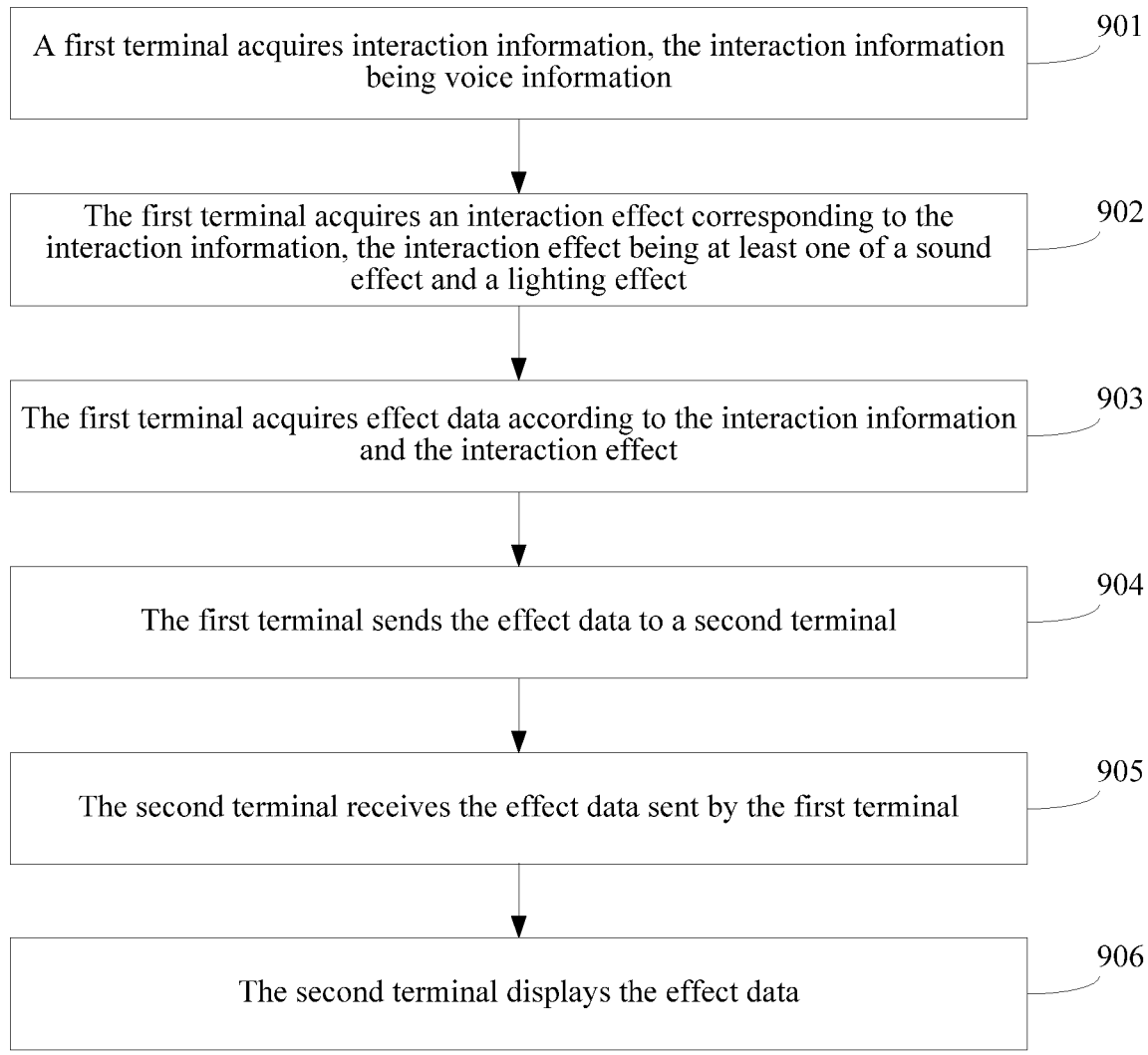
FIG. 9 is a flowchart of an information interaction method according to another embodiment of the present invention.

An embodiment of the present invention provides an information interaction method, where the method is applied to a first terminal installed with an interaction program, and a second terminal that is connected to the first terminal and installed with a voice player and a lighting device. With reference to the content of the embodiments shown in the foregoing FIG. 1 and FIG. 2, because the interaction information includes at least one type of voice information, text information and expression information, the acquiring an interaction effect corresponding to the interaction information has multiple cases. For ease of description, in this embodiment, using the interaction information as the text information as an example, the method provided in this embodiment of the present invention is explained and described in detail. Referring to FIG. 9, a process of the method includes:

901: A first terminal acquires interaction information, the interaction information being voice information.

The first terminal includes but is not limited to an intelligent terminal that may be installed with an interaction program, such as a mobile phone, and a tablet computer. A first terminal acquiring interaction information includes but is not limited to:

detecting, by the first terminal, a text input instruction, and displaying a text input interface according to the text input instruction; and acquiring, by the first terminal, text information input in the text input interface, and using the text information as the acquired interaction information.

The manner for detecting the text input instruction is not specifically limited in this embodiment. During specific implementation, an interaction interface may be displayed, and the interaction interface displays a text input button. If it is detected that the text input button is clicked, the text input instruction is detected. Certainly, apart from the foregoing manner, a voice instruction may further be detected, and whether the voice instruction is the text input instruction is determined; and if the voice instruction is the text input instruction, the text input instruction is detected.

Further, after the displaying the text input interface according to the text input instruction, the first terminal may acquire text information input in the text input interface, and use the text information as acquired interaction information. This embodiment does not limit the manner for acquiring text information input in the text input interface. During specific implementation, if the text input interface displays a keyboard, the text information input in the text input interface by using the keyboard may be acquired.

For ease of understanding, using the interaction interface shown in FIG. 5(2) as an example for description, the interaction interface displays a keyboard switch button, and the keyboard switch button is a text input button. If it is detected that the keyboard switch button is clicked, the text input instruction is detected; the text input interface is displayed according to the text input instruction, and the text input interface further displays a keyboard and a text input box, as shown in FIG. 10(1); by displaying the text input interface, a user learns text information that may be input currently, that is, the user learns that the text information may be input in the text input box by using the keyboard on the text input interface, so that the text information that is acquired by the first terminal and input in the text input box by using the keyboard on the text input interface is "come to dinner", and the text information is used as the acquired interaction information, as shown in FIG. 10(2).

902: The first terminal acquires an interaction effect corresponding to the interaction information, the interaction effect being at least one of a sound effect and a lighting effect.

The implementation manner of the step is the same as that of step 302 in the embodiment shown in FIG. 3, and for details, reference may be made to the implementation manner of step 302 in the embodiment shown in FIG. 3, which are not described again herein.

Figure 10:
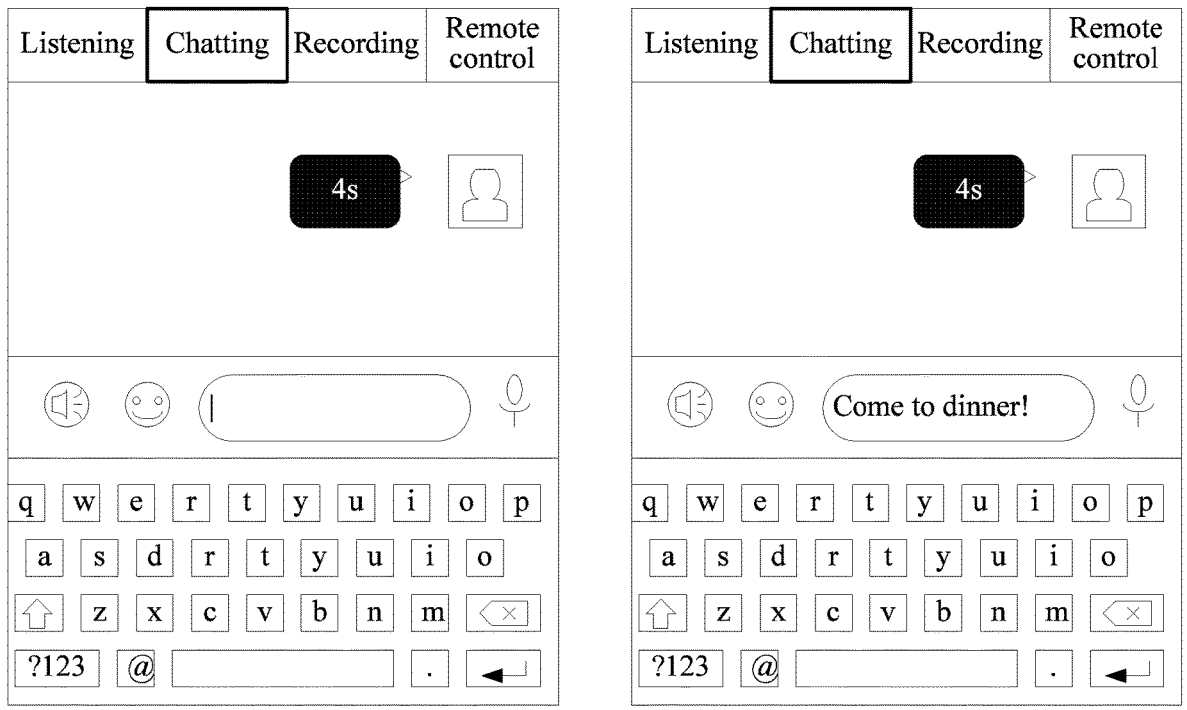
FIG. 10 is a schematic diagram of an interaction interface according to another embodiment of the present invention.
Figure 10:
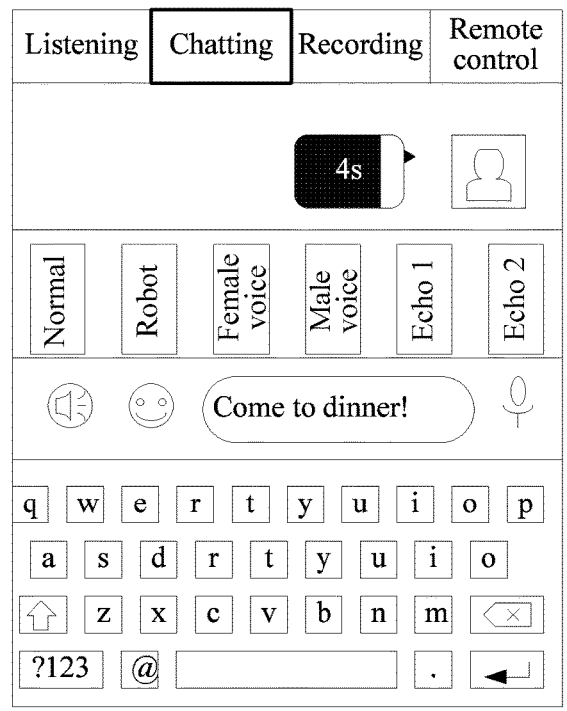

For ease of understanding, still using the interaction interface shown in FIG. 10(2) as an example for description, the interaction interface displays a sound effect button; and if it is detected that the sound effect button is clicked, the interaction interface shown in FIG. 10(3) is displayed. 6 sound effects: "normal voice", "robot", "female voice", "male voice", "echo 1" and "echo 2", displayed on the interaction interface are used as optional interaction effects. If it is detected that a clicked optional interaction effect is the "female voice", the "female voice" is used as the detected selected interaction effect, and the selected interaction effect is used as an interaction effect corresponding to the interaction information, that is, the interaction effect corresponding to the interaction information is the "female voice".

903: The first terminal acquires effect data according to the interaction information and the interaction effect.

The manner for the first terminal to acquire the effect data according to the interaction information and the interaction effect is not specifically limited in this embodiment. Because the interaction information acquired in the foregoing step 901 is text information, the acquiring effect data according to the interaction information and the interaction effect includes but is not limited to:

processing the text information according to the interaction effect to obtain the effect data.

For ease of understanding, still using the interaction interface shown in FIG. 10(3) as an example for description, if the interaction effect is the "female voice", and the interaction information is the text information "come to dinner", when the text information is processed according to the interaction effect, text information "come to dinner" may be first changed to voice information "come to dinner", and then audio voice change processing is performed on the voice information "come to dinner" according to the "female voice", to obtain the effect data.

904: The first terminal sends the effect data to a second terminal.

The implementation manner of the step is the same as that of step 304 in the embodiment shown in FIG. 3, and for details, reference may be made to the implementation manner of step 304 in the embodiment shown in FIG. 3, which are not described again herein.

As an optional embodiment, after the first terminal sends the effect data to the second terminal, the interaction interface of the first terminal may further display an identifier corresponding to the sent effect data. Different effect data may be corresponding to different identifiers. Using the interaction effect being the "female voice", and the interaction information being the text information "come to dinner" as an example, an identifier corresponding to the effect data acquired according to the text information "come to dinner" and the interaction effect "female voice" may be the content of the text information: "come to dinner".

905: The second terminal receives the effect data sent by the first terminal

The manner for the second terminal to receive the effect data sent by the first terminal is not specifically limited in this embodiment. After receiving the effect data sent by the first terminal, the second terminal may perform the subsequent steps.

906: The second terminal displays the effect data.

The implementation manner of the step is the same as that of step 306 in the embodiment shown in FIG. 3, and for details, reference may be made to the implementation manner of step 306 in the embodiment shown in FIG. 3, which are not described again herein.

In addition, referring to the interaction flowchart shown in FIG. 6, step 901 to step 903 are corresponding to chatting, selecting audio, selecting a word message, inputting a word message, and confirming sending; step 904 is corresponding to confirming connection to a second terminal, whether to connect, connection prompting, prompting not to connect and being unable to play; and step 905 and step 906 are corresponding to a second terminal executing an acousto-optic play and playing a feedback successfully.

Further, through the foregoing step 901 to step 906, information interaction is completed. To enrich information interaction manners, as an optional embodiment, the method provided in this embodiment further includes but is not limited to:

acquiring, by the second terminal, voice information, and sending the voice information to the first terminal; and receiving, by the first terminal, the voice information sent by the second terminal, and playing the voice information.

The manner for the second terminal to acquire the voice information and the first terminal to receive the voice information sent by the second terminal are not specifically limited in this embodiment.

As an optional embodiment, before the second terminal acquires the voice information, the method further includes but is not limited to:

detecting, by the second terminal, a voice acquiring instruction, and sending a sound recording request to the first terminal according to the voice acquiring instruction;

receiving, by the first terminal, a sound recording request sent by the second terminal;

determining, by the first terminal, whether to accept the sound recording request; and returning, by the first terminal, a sound recording instruction to the second terminal if the first terminal accepts the sound recording request; and receiving, by the second terminal, a sound recording instruction that is returned by the first terminal according to the sound recording request.

The manner for the second terminal to detect a voice acquiring instruction is not specifically limited in this embodiment. During specific implementation, if the second terminal provides a sound recording button, and detects that the sound recording button is clicked, a voice acquiring instruction is detected. Certainly, apart from the foregoing manner, a voice instruction may further be detected, and whether the voice instruction is the voice acquiring instruction is determined; and if the voice instruction is the voice acquiring instruction, the voice acquiring instruction is detected.

Further, the second terminal acquiring the voice information includes but is not limited to: the second terminal acquiring the voice information according to a sound recording instruction. The first terminal receiving the voice information sent by the second terminal includes but is not limited to: the first terminal receiving the voice information that is acquired by the second terminal according to the sound recording instruction.

In addition, referring to the interaction flowchart shown in FIG. 7, step 901 and step 902 are corresponding to sending a text voice change message, and inputting a text; step 903 and step 904 are corresponding to transforming to voice and audio voice change processing; and step 905 and step 906 are corresponding to a loudspeaker: output, a microphone: input, holding a device sound recording button, a first terminal controlling a sound recording source and receiving a second terminal voice message, and a second terminal loudspeaker: output.

When the first terminal is connected to the second terminal via WiFi, the interaction process may also be shown in FIG. 8. Step 901 and step 902 are corresponding to sending a text voice change message, and inputting a word; step 903 and step 904 are corresponding to transforming to a voice and audio voice change processing, a network server and a storage database; and step 905 and step 906 are corresponding to a loudspeaker: output, a microphone: input, a network server, a storage database, a first terminal controlling a sound recording source and receiving a second terminal voice message, and a second terminal loudspeaker: output.

In the method provided in this embodiment, interaction information including text information is acquired by using a first terminal, the interaction information and an interaction effect corresponding to the interaction information are acquired, then effect data is acquired according to the interaction information and the interaction effect, the effect data is sent to a second terminal, and the second terminal displays the effect data. Only one interacted terminal installed with an interaction program is needed to implement information interaction, and the interaction effect is at least one of a sound effect and a lighting effect, which enrich information interaction manners.

Figure 11:
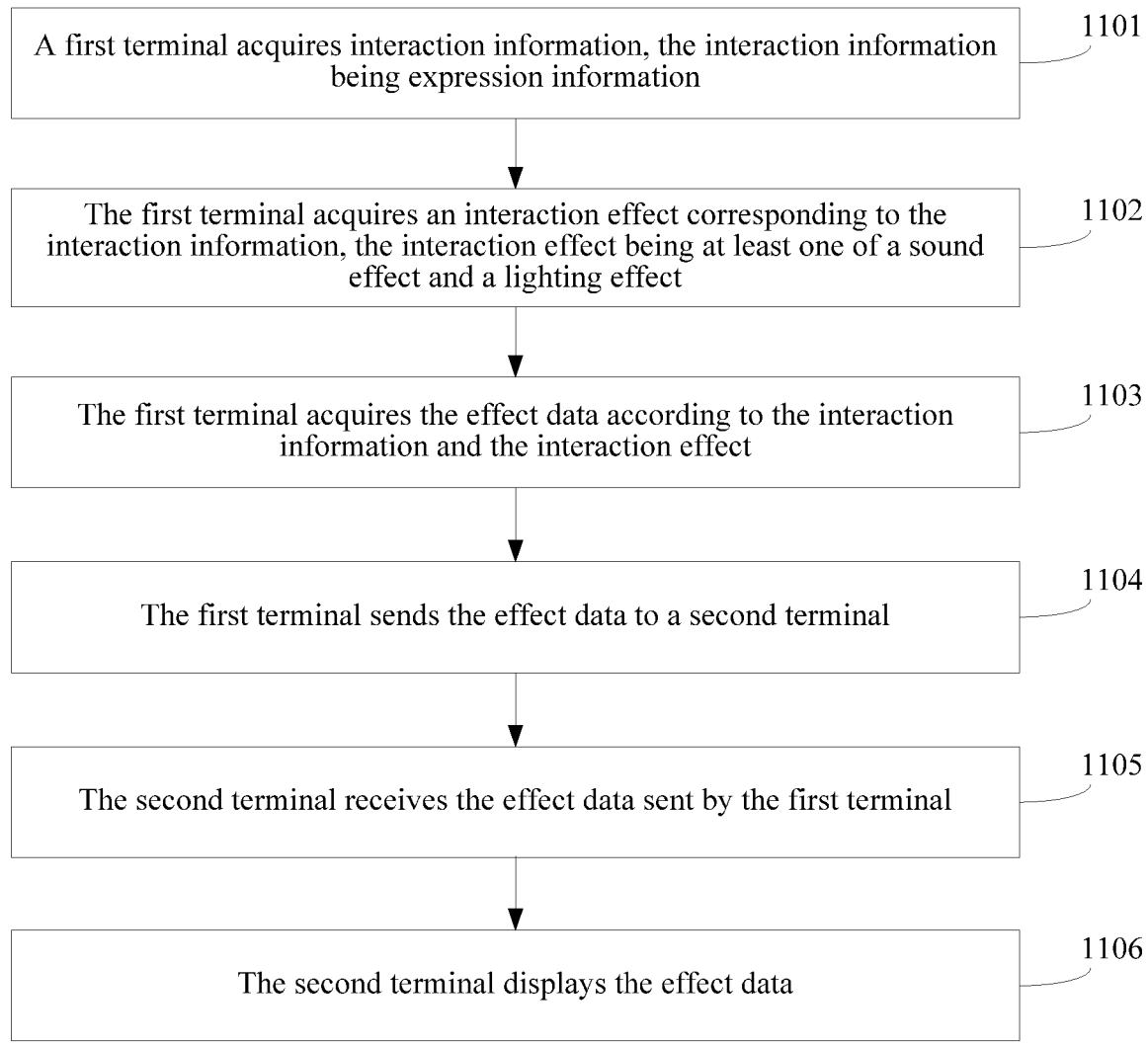
FIG. 11 is a flowchart of an information interaction method according to another embodiment of the present invention.

An embodiment of the present invention provides an information interaction method, where the method is applied to a first terminal installed with an interaction program, and a second terminal that is connected to the first terminal and installed with a voice player and a lighting device. With reference to the content of the embodiments shown in FIG. 1 and FIG. 2, because the interaction information includes at least one type of voice information, text information and expression information, the acquiring an interaction effect corresponding to the interaction information has multiple cases. For ease of description, in this embodiment, using the interaction information being voice information as an example, the method provided in this embodiment of the present invention is explained and described in detail. Referring to FIG. 11, a process of the method includes:

1101: A first terminal acquires interaction information, the interaction information being expression information.

The first terminal includes but is not limited to an intelligent terminal that may be installed with an interaction program, such as a mobile phone, and a tablet computer. A first terminal acquiring interaction information includes but is not limited to:

detecting, by the first terminal, an expression input instruction, and displaying an expression selection interface according to the expression input instruction; and acquiring, by the first terminal, selected expression information in the expression interface, and using the selected expression information as the acquired interaction information.

The manner for detecting an expression input instruction is not specifically limited in this embodiment. During specific implementation, an interaction interface may be displayed, and an expression input button may be displayed on the interaction interface. If it is detected that the expression input button is clicked, an expression input instruction is detected. Certainly, apart from the foregoing manner, a voice instruction may also be detected, and whether the voice instruction is an expression input instruction is determined; and if the voice instruction is the expression input instruction, the expression input instruction is detected.

Further, after the expression selection interface is displayed according to the expression input instruction, the first terminal may acquire the selected expression information in the expression selection interface, and use the expression information as the acquired interaction information. This embodiment does not limit the manner for displaying the expression selection interface according to the expression input instruction. During specific implementation, a selection interface of default expression information and a selection interface of custom expression information may be provided on the expression input interface. An interaction effect corresponding to expression information in the selection interface of the default expression information is preset, and an interaction effect corresponding to expression information in the selection interface of the custom expression information is optional.

Figure 12:
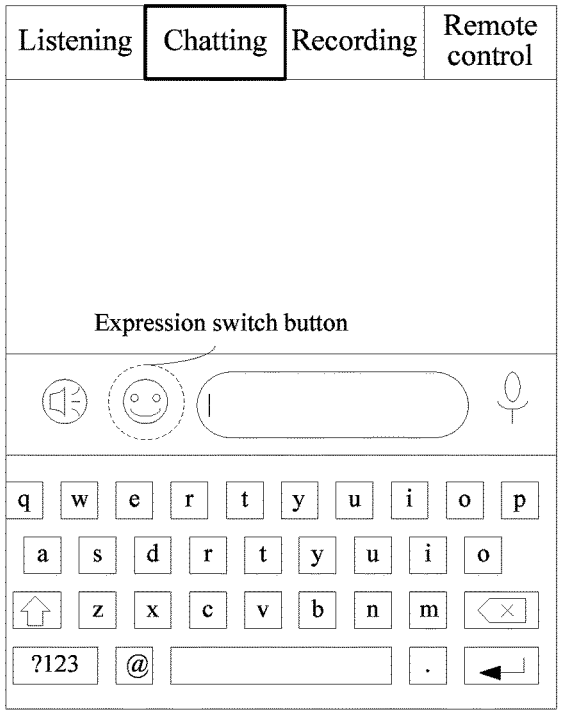
FIG. 12 is a schematic diagram of an interaction interface according to another embodiment of the present invention.
Figure 12:
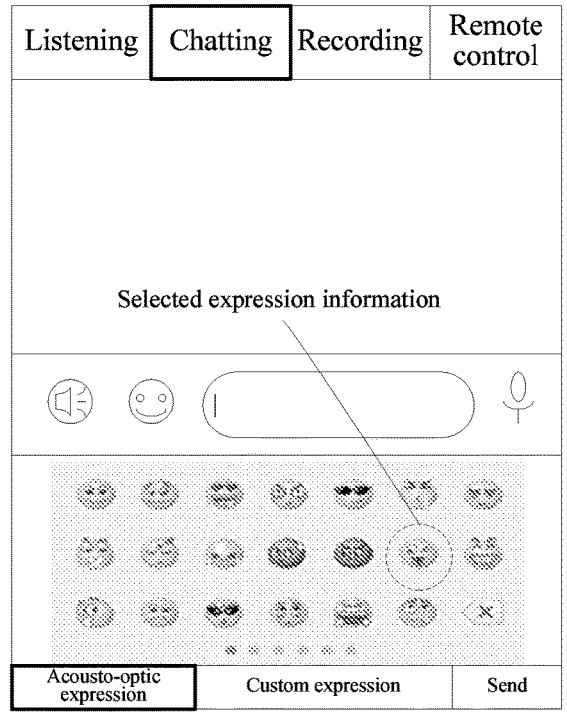
Figure 12:
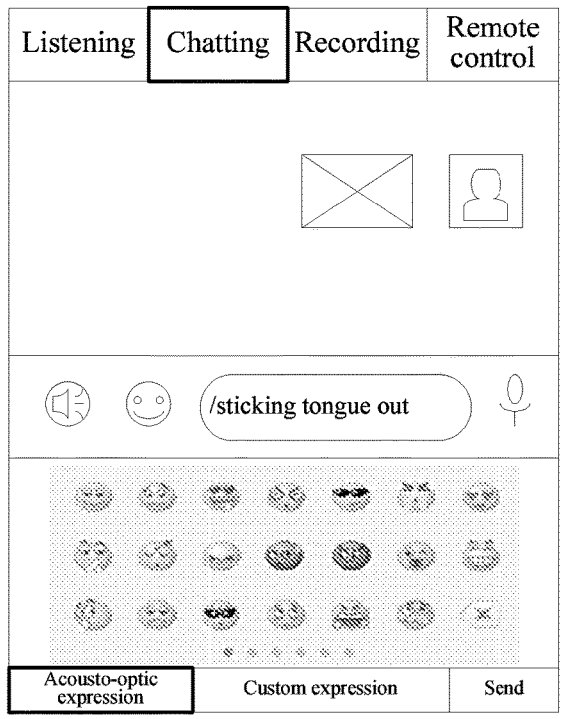

For ease of understanding, using the interaction interface shown in FIG. 12(1) as an example for description, the interaction interface displays an expression switch button, and the expression switch button is an expression input button. If it is detected that the expression switch button is clicked, an expression input instruction is detected; and an expression selection interface is displayed according to the expression input instruction, the expression selection interface is categorized into an acousto-optic expression interface and a custom expression interface, and a text input box is further displayed on the expression selection interface, as shown in FIG. 12(2). In addition, if a left-right sliding operation is detected, and more expression information may further be displayed, so that the optional expression information is richer. The acousto-optic expression interface is a selection interface of default expression information and the custom expression interface is a selection interface of custom expression information. An interface may be switched to an acousto-optic expression interface by using a label page "acousto-optic expression", and may be switched to a custom expression interface by using a label page "custom expression".

Using the acousto-optic expression interface shown in FIG. 12(2) as an example, if the selected expression information in the expression selection interface acquired by the first terminal is expression information corresponding to "sticking tongue out", text information "/sticking tongue out" is displayed in the text input box, and expression information corresponding to "sticking tongue out" is used as the acquired interaction information, as shown in FIG. 12(3).

Figure 13:
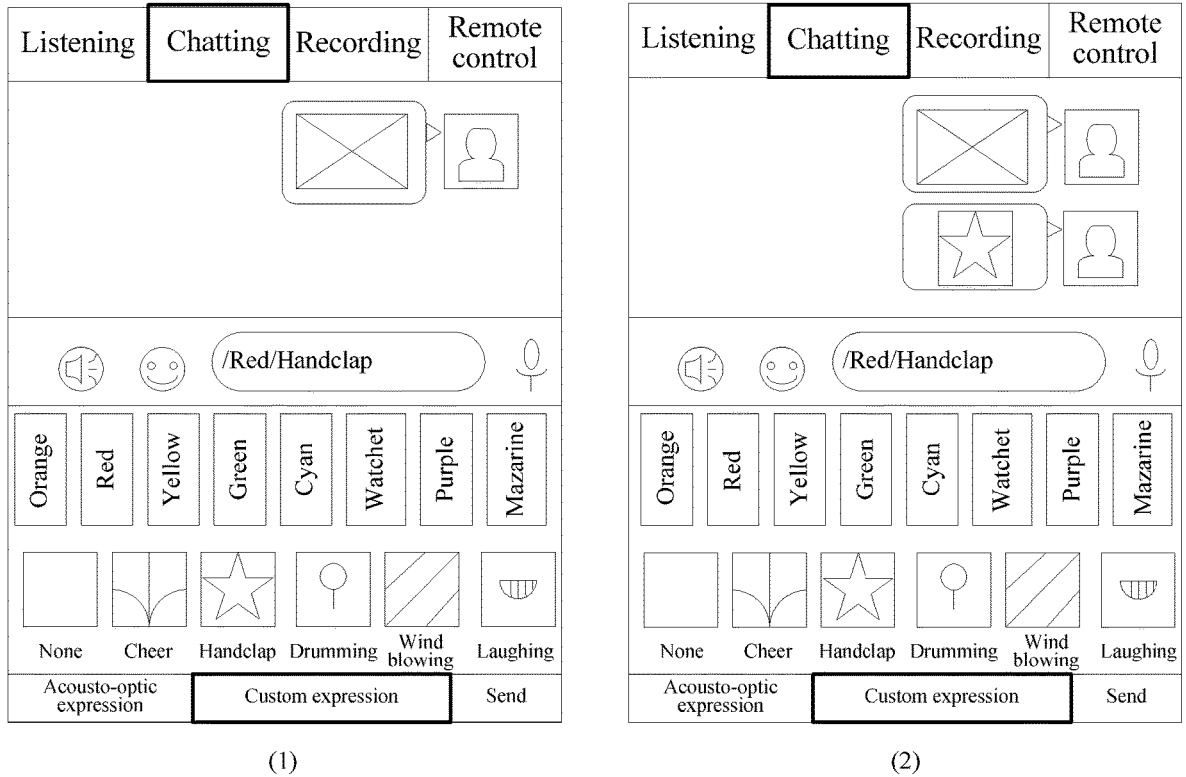
FIG. 13 is a schematic diagram of an interaction interface according to another embodiment of the present invention.

In addition, if it is detected that a label page "custom expression" is clicked, a custom expression interface is displayed, and expression information corresponding to "none", "cheer", "handclap", "drumming", "wind blowing" and "laughing" is provided, as shown in FIG. 13(1). If the selected expression information in the expression selection interface acquired by the first terminal is expression information corresponding to "handclap", text information is displayed in the text input box, and after text information "/handclap" is displayed in the text input box, the expression information corresponding to "handclap" is used as the acquired interaction information.

1102: The first terminal acquires an interaction effect corresponding to the interaction information, the interaction effect being at least one of a sound effect and a lighting effect.

Because the interaction information is expression information, when the selected expression information is acquired from the selection interface of the default expression information, an interaction effect corresponding to the selected expression information is preset; and when the selected expression information is acquired from the selection interface of the custom expression information, an interaction effect corresponding to the selected expression information is optional or may be preset. Therefore, the first terminal acquiring an interaction effect corresponding to the interaction information includes but is not limited to the following two cases:

(1) When the selected expression information is acquired from a default expression information selection interface, and the selected expression information is used as interaction information, searching for an interaction effect corresponding to preset interaction information, and using the found interaction effect as the interaction effect corresponding to the acquired interaction information.

(2) When the selected expression information is acquired from a custom expression information selection interface, and the selected expression information is used as interaction information, displaying at least one optional interaction effect of a sound effect and a lighting effect on the interaction interface; and detecting the selected interaction effect, and using the selected interaction effect as an interaction effect corresponding to the interaction information, the selected interaction effect being at least one.

For ease of understanding, still using the interaction interface shown in FIG. 13(1) as an example for description, 8 lighting effects "orange", "red", "yellow", "green", "cyan", "watchet", "purple" and "mazarine" displayed on the interaction interface are used as optional interaction effects; and if it is detected that the clicked optional interaction effect is "red", "red" is used as the detected selected interaction effect, and the selected interaction effect is used as an interaction effect corresponding to the interaction information, that is, the interaction effect corresponding to the interaction information "handclap" is "red". The interaction information "handclap" is further corresponding to a preset sound effect "pia pia pia".

1103: The first terminal acquires the effect data according to the interaction information and the interaction effect.

The manner for the first terminal to acquire the effect data according to the interaction information and the interaction effect is not specifically limited in this embodiment. Because the interaction information acquired in the foregoing step 1101 is expression information, the acquiring the effect data according to the interaction information and the interaction effect includes but is not limited to:

obtaining the effect data according to the selected expression information and the interaction effect.

If the interaction effect includes a sound effect and a lighting effect, the effect data obtained according to the selected expression information and the interaction effect includes sound effect data and lighting effect data.

Using a default expression information "snoring" as an example, if an interaction effect corresponding to preset "snoring" includes a sound effect and a lighting effect, and the sound effect corresponding to "snoring" is "dooby dooby", and the lighting effect corresponding to the "snoring" is "flashing blue", sound effect data and lighting effect data are obtained.

1104: The first terminal sends the effect data to a second terminal.

The implementation manner of the step is the same as that of step 304 in the embodiment shown in FIG. 3, and for details, reference may be made to the implementation manner of step 304 in the embodiment shown in FIG. 3, which are not described again herein.

As an optional embodiment, after the first terminal sends the effect data to the second terminal, the interaction interface of the first terminal may further display an identifier corresponding to the sent effect data. Different effect data may be corresponding to different identifiers. Using an interaction effect being "red", and an interaction information being expression information "handclap" as an example, an identifier corresponding to effect data acquired according to the expression information "handclap" and the interaction effect "red" may be an identifier corresponding to the expression information "handclap", as shown in FIG. 13(2).

1105: The second terminal receives the effect data sent by the first terminal The manner for the second terminal to receive the effect data sent by the first terminal is not specifically limited in this embodiment. After receiving the effect data sent by the first terminal, the second terminal may perform the subsequent steps.

As an optional embodiment, if the effect data includes sound effect data and lighting effect data, a voice player installed in the second terminal may receive the sound effect data, and a lighting device installed in the second terminal may receive the lighting effect data.

1106: The second terminal displays the effect data.

The manner for the second terminal to display the effect data is not specifically limited in this embodiment. During specific implementation, because an interaction effect corresponding to the interaction information acquired in the foregoing step 302 is a sound effect or a lighting effect, the second terminal displaying the effect data includes but is not limited to: the second terminal controlling, according to the effect data, the voice player to play a corresponding sound effect and the lighting device to display a corresponding lighting effect.

In addition, referring to the interaction flowchart shown in FIG. 6, step 1101 to step 1103 are corresponding to selecting an acoustic/optical expression, selecting an acousto-optic expression/custom expression, and confirming sending; step 1104 is corresponding to confirming connection to a second terminal, whether to connect, connection prompting, prompting not to connect and being unable to play; and step 1105 and step 1106 are corresponding to a second terminal executing an acousto-optic play and playing a feedback successfully.

Further, through the foregoing step 1101 to step 1106, information interaction is completed. To enrich information interaction manners, as an optional embodiment, the method provided in this embodiment further includes but is not limited to:

acquiring, by the second terminal, voice information, and sending the voice information to the first terminal; and receiving, by the first terminal, the voice information sent by the second terminal, and playing the voice information.

The manner for the second terminal to acquire the voice information and the first terminal to receive the voice information sent by the second terminal are not specifically limited in this embodiment.

As an optional embodiment, before the second terminal acquires the voice information, the method further includes but is not limited to:

detecting, by the second terminal, a voice acquiring instruction, and sending a sound recording request to the first terminal according to the voice acquiring instruction;

receiving, by the first terminal, a sound recording request sent by the second terminal;

determining, by the first terminal, whether to accept the sound recording request; and returning, by the first terminal, a sound recording instruction to the second terminal if the first terminal accepts the sound recording request; and receiving, by the second terminal, a sound recording instruction that is returned by the first terminal according to the sound recording request.

The manner for the second terminal to detect a voice acquiring instruction is not specifically limited in this embodiment. During specific implementation, if the second terminal provides a sound recording button, and detects that the sound recording button is clicked, a voice acquiring instruction is detected. Certainly, apart from the foregoing manner, a voice instruction may further be detected, and whether the voice instruction is the voice acquiring instruction is determined; and if the voice instruction is the voice acquiring instruction, the voice acquiring instruction is detected.

Further, the second terminal acquiring the voice information includes but is not limited to: the second terminal acquiring the voice information according to a sound recording instruction. The first terminal receiving the voice information sent by the second terminal includes but is not limited to: the first terminal receiving the voice information that is acquired by the second terminal according to the sound recording instruction.

In addition, referring to the interaction flowchart shown in FIG. 7, step 1101 and step 1102 are corresponding to selecting an acousto-optic expression; step 1103 and step 1104 are corresponding to an audio and lighting instruction; and step 1105 and step 1106 are corresponding to a loudspeaker: output and a chest lamp: output, a microphone: input, holding a device sound recording button, a first terminal controlling a sound recording source and receiving a second terminal voice message, and a second terminal loudspeaker: output.

When the first terminal is connected to the second terminal via WiFi, the interaction process may further be shown in FIG. 8. Step 1101 and step 1102 are corresponding to selecting an acousto-optic expression; step 1103 and step 1104 are corresponding to audio, a lighting instruction, a network server and a storage database; and step 1105 and step 1106 are corresponding to a loudspeaker: output, a microphone: input, a network server, a storage database, a first terminal controlling a sound recording source and receiving a second terminal voice message, and a second terminal loudspeaker: output.

In the method provided in this embodiment, interaction information including expression information is acquired by using a first terminal, the interaction information and an interaction effect corresponding to the interaction information are acquired, then effect data is acquired according to the interaction information and the interaction effect, the effect data is sent to a second terminal, and the second terminal displays the effect data. Only one interacted terminal installed with an interaction program is needed to implement information interaction, and the interaction effect is at least one of a sound effect and a lighting effect, which enrich information interaction manners.

Figure 14:
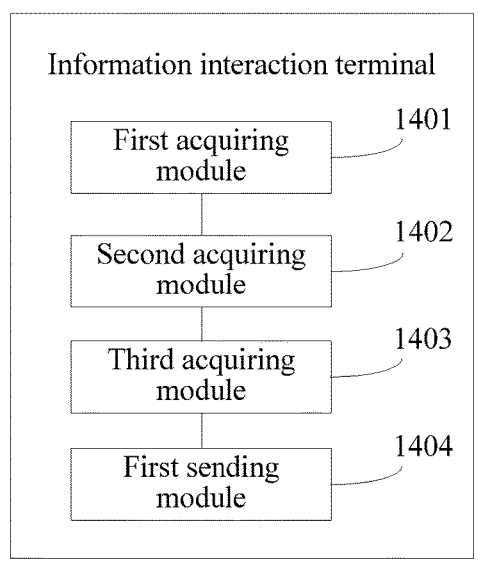
FIG. 14 is a schematic structural diagram of an information interaction terminal according to another embodiment of the present invention.

An embodiment of the present invention provides an information interaction terminal, where the terminal is installed with an interaction program, the terminal is connected to a second terminal; installed with a voice player and a lighting device, and the terminal is configured to execute the method provided in any of the foregoing embodiments. Referring to FIG. 14, the terminal includes:
a first acquiring module 1401, configured to acquire interaction information, the interaction information including at least one type of voice information, text information and expression information;
a second acquiring module 1402, configured to acquire an interaction effect corresponding to the interaction information, the interaction effect being at least one of a sound effect and a lighting effect;
a third acquiring module 1403, configured to acquire effect data according to the interaction information and the interaction effect; and
a first sending module 1404, configured to send the effect data to the second terminal, the second terminal displaying the effect data.

Figure 15:
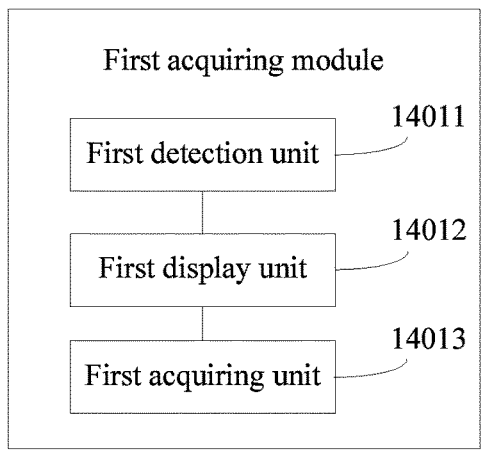
FIG. 15 is a schematic structural diagram of a first acquiring module according to another embodiment of the present invention.

As an optional embodiment, referring to FIG. 15, the first acquiring module 1401 includes:
a first detection unit 14011, configured to detect a sound recording instruction;
a first display unit 14012, configured to display a sound recording interface according to the sound recording instruction; and
a first acquiring unit 14013, configured to acquire voice information input by the sound recording interface, and use the voice information as acquired interaction information, where
the third acquiring module 1403 is configured to process the voice information according to the interaction effect to obtain the effect data.

Figure 16:
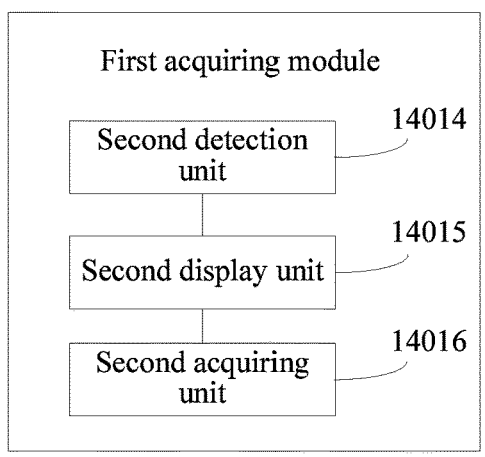
FIG. 16 is a schematic structural diagram of a first acquiring module according to another embodiment of the present invention.

As an optional embodiment, referring to FIG. 16, the first acquiring module 1401 includes:
a second detection unit 14014, configured to detect a text input instruction;
a second display unit 14015, configured to display a text input interface according to the text input instruction; and
a second acquiring unit 14016, configured to acquire text information input in the text input interface, and use the text information as the acquired interaction information, where
the third acquiring module 1403 is configured to process the text information according to the interaction effect to obtain the effect data.

Figure 17:
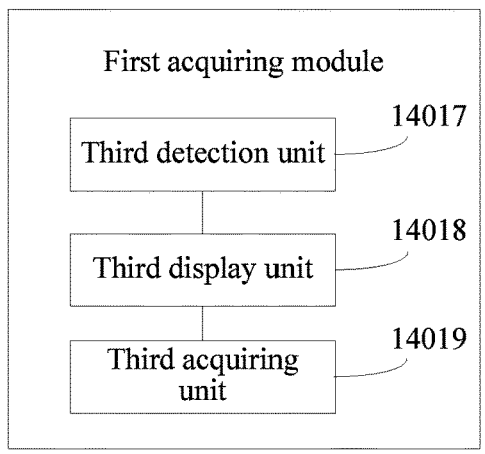
FIG. 17 is a schematic structural diagram of a first acquiring module according to another embodiment of the present invention.

As an optional embodiment, referring to FIG. 17, the first acquiring module 1401 includes:
a third detection unit 14017, configured to detect an expression input instruction;
a third display unit 14018, configured to display an expression selection interface according to the expression input instruction; and
a third acquiring unit 14019, configured to acquire selected expression information in the expression interface, and use the selected expression information as the acquired interaction information, where
the third acquiring module 1403 is configured to obtain the effect data according to the selected expression information and the interaction effect.

Figure 18:
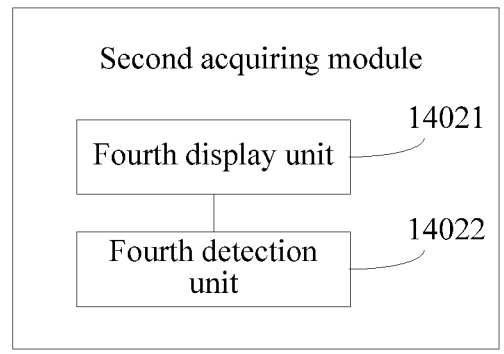
FIG. 18 is a schematic structural diagram of a second acquiring module according to another embodiment of the present invention.

As an optional embodiment, referring to FIG. 18, the second acquiring module 1402 includes:
a fourth display unit 14021, configured to display an interaction interface, where the interaction interface displays at least one optional interaction effect of a sound effect and a lighting effect; and
a fourth detection unit 14022, configured to detect the selected interaction effect, and use the selected interaction effect as an interaction effect corresponding to the interaction information, the selected interaction effect being at least one.

Figure 19:
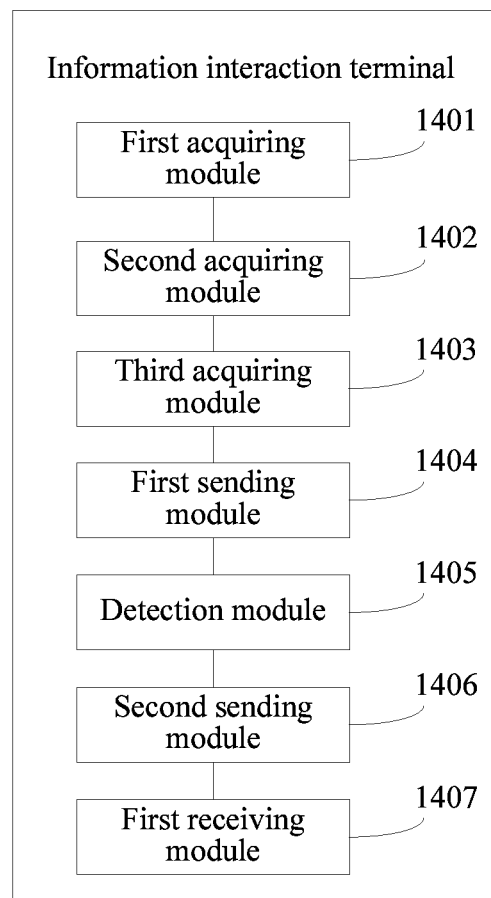
FIG. 19 is a schematic structural diagram of an information interaction terminal according to another embodiment of the present invention.

As an optional embodiment, referring to FIG. 19, the terminal further includes:
a detection module 1405, configured to detect a use record acquiring instruction;
a second sending module 1406, configured to send a use record acquiring request to the second terminal according to the use record acquiring instruction; and
a first receiving module 1407, configured to receive a use record that is returned by the second terminal according to the use record acquiring request and is corresponding to the first terminal.

Figure 20:
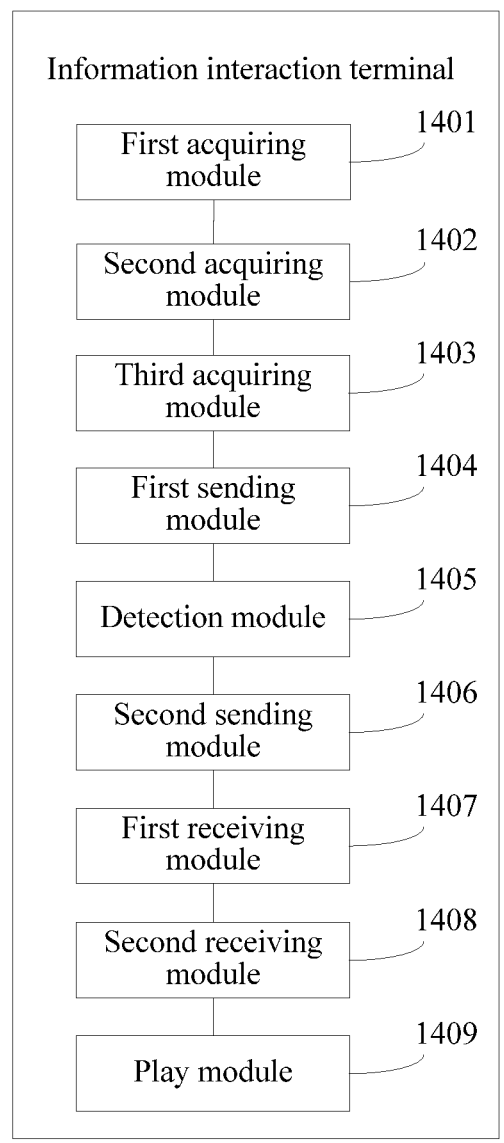
FIG. 20 is a schematic structural diagram of an information interaction terminal according to another embodiment of the present invention.

As an optional embodiment, referring to FIG. 20, the terminal further includes:
- a second receiving module 1408, configured to receive voice information sent by the second terminal; and
- a play module 1409, configured to play the voice information.

Figure 21:
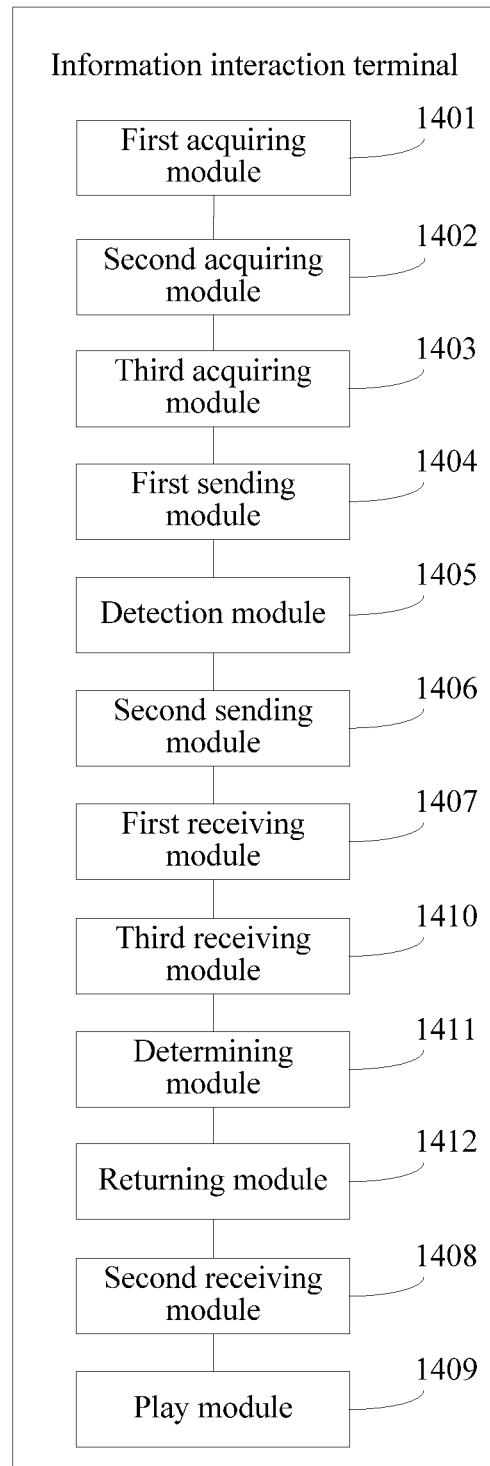
FIG. 21 is a schematic structural diagram of an information interaction terminal according to another embodiment of the present invention.

As an optional embodiment, referring to FIG. 21, the terminal further includes:
- a third receiving module 1410, configured to receive a sound recording request sent by the second terminal;
- a determining module 1411, configured to determine whether to accept the sound recording request; and
- a returning module 1412, configured to return a sound recording instruction to the second terminal when it is determined to accept the sound recording request, where
- the second receiving module 1408, configured to receive voice information that is acquired by the second terminal according to the sound recording instruction.

The terminal provided in this embodiment of the present invention acquires interaction information and an interaction effect corresponding to the interaction information, then acquires effect data according to the interaction information and the interaction effect, and sends the effect data to a second terminal, and the second terminal displays the effect data. Only one interacted terminal installed with an interaction program is needed to implement information interaction, the interaction information is at least one type of voice information, text information and expression information, and the interaction effect is at least one of a sound effect and a lighting effect, which enrich information interaction manners.

Figure 22:
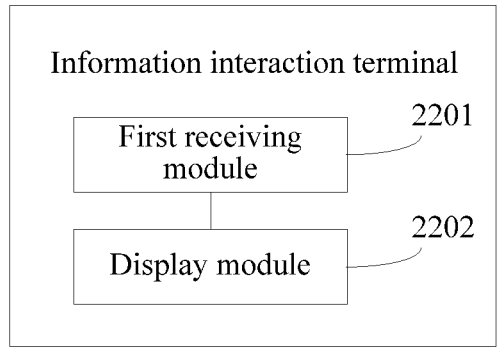
FIG. 22 is a schematic structural diagram of an information interaction terminal according to another embodiment of the present invention.

An embodiment of the present invention provides an information interaction terminal, where the terminal is installed with a voice player and a lighting device, the terminal is connected to a first terminal installed with an interaction program, and the terminal is configured to execute the method provided in any of the foregoing embodiments. Referring to FIG. 22, the terminal includes:
- a first receiving module 2201, configured to receive effect data sent by the first terminal; and
- a display module 2202, configured to display the effect data.

The effect data is obtained by the first terminal according to the acquired interaction information and the acquired interaction effect. The interaction information includes at least one type of voice information, text information and expression information, the interaction effect is an interaction effect corresponding to the interaction information, and the interaction effect is at least one of a sound effect and a lighting effect.

As an optional embodiment, the display module 2202 is configured to control, according to the effect data, the voice player to play a corresponding sound effect and/or the lighting device to display a corresponding lighting effect.

Figure 23:
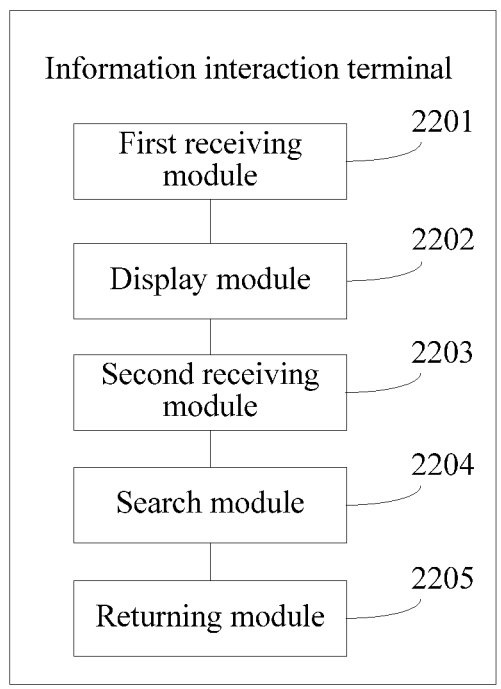
FIG. 23 is a schematic structural diagram of an information interaction terminal according to another embodiment of the present invention.
Figure 24:
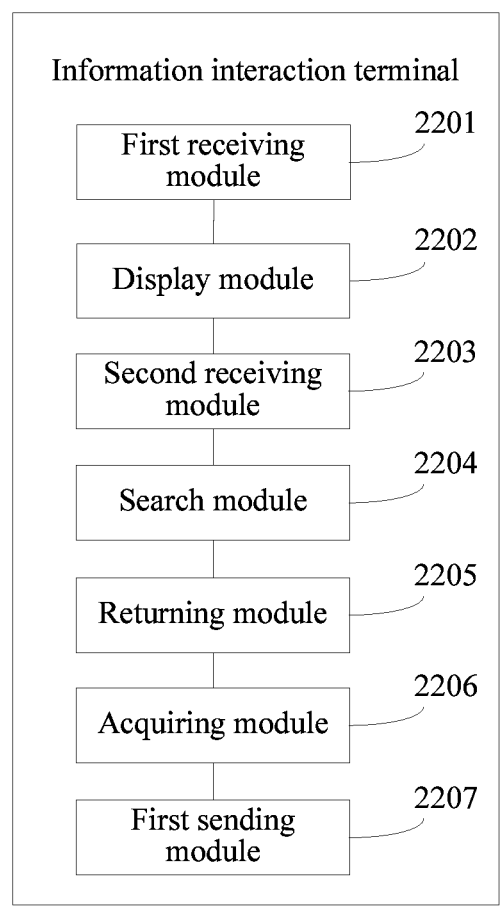
FIG. 24 is a schematic structural diagram of an information interaction terminal according to another embodiment of the present invention.

As an optional embodiment, referring to FIG. 23, the terminal further includes:
- a second receiving module 2203, configured to receive a use record acquiring request sent by the first terminal;
- a search module 2204, configured to search, according to the use record acquiring request, for a use record corresponding to the first terminal; and
- a returning module 2205, configure to return the use record to the first terminal As an optional embodiment, referring to FIG. 24, the terminal further includes:
- an acquiring module 2206, configured to acquire voice information; and
- a first sending module 2207, configured to send the voice information to the first terminal, the first terminal playing the voice information.

Figure 25:
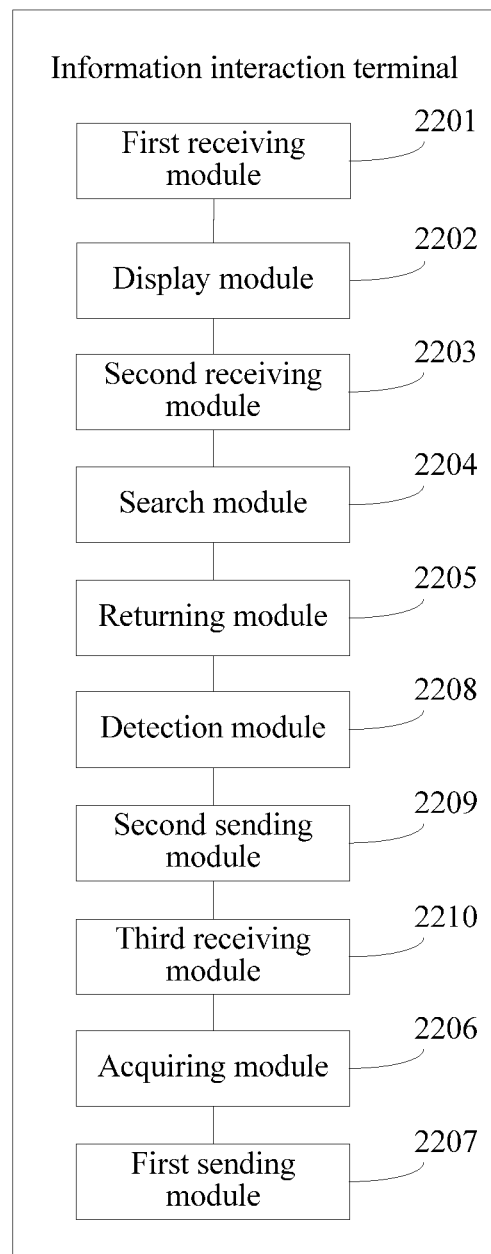
FIG. 25 is a schematic structural diagram of an information interaction terminal according to another embodiment of the present invention.

As an optional embodiment, referring to FIG. 25, the terminal further includes:
- a detection module 2208, configured to detect a voice acquiring instruction;
- a second sending module 2209, configured to send a sound recording request to the first terminal according to the voice acquiring instruction;
- a third receiving module 2210, configured to receive a sound recording instruction that is returned by the first terminal according to the sound recording request; and
- an acquiring module 2206, configured to acquire the voice information according to the sound recording instruction.

The terminal provided in this embodiment receives effect data sent by a first terminal, and displays the effect data, and only one interacted terminal installed with an interaction program is needed to implement information interaction. Because the effect data is obtained by the first terminal according to acquired interaction information and an interaction effect corresponding to the acquired interaction information, the interaction information includes at least one type of voice information, text information and expression information, and the interaction effect is at least one of a sound effect and a lighting effect, which enrich information interaction manners.

Figure 26:
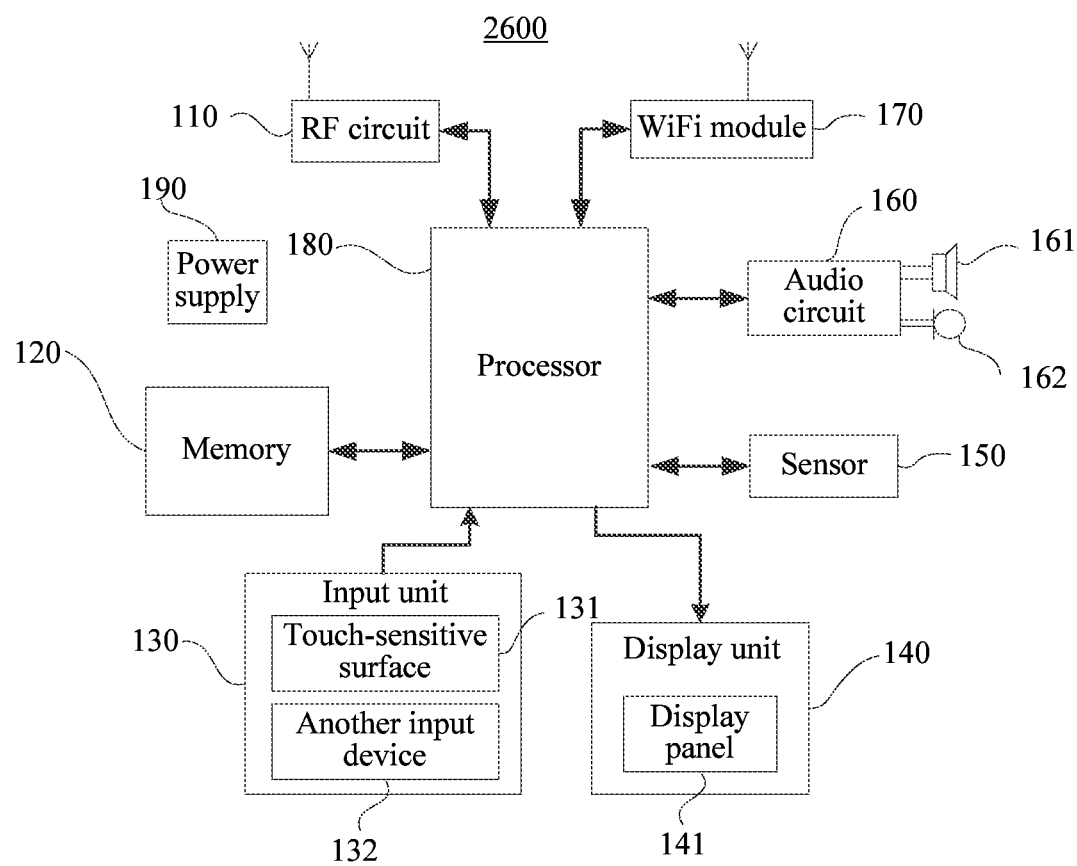
FIG. 26 is a schematic structural diagram of a terminal according to another embodiment of the present invention.

An embodiment of the present invention provides a terminal, where the terminal is installed with an interaction program, and the terminal is connected to a second terminal installed with a voice player and a lighting device. FIG. 26 shows a schematic structural diagram of a terminal involved in this embodiment of the present invention. The terminal may be configured to implement the information interaction method provided in the foregoing embodiments. Specifically:

The terminal 2600 may include components such as an RF (Radio Frequency) circuit 110, a memory 120 including one or more computer readable storage media, an input unit 130, a display unit 140, a sensor 150, an audio circuit 160, a WiFi module 170, a processor 180 including one or more processing cores, and a power supply 190. A person skilled in the art may understand that the structure of the terminal shown in FIG. 26 does not constitute a limitation to the terminal, and the terminal may include more components or fewer components than those shown in the figure, or some components may be combined, or a different component deployment may be used.

The RF circuit 110 may be configured to receive and send signals during an information receiving and sending process or a call process. Particularly, the RF circuit 110 receives downlink information from a base station, then delivers the downlink information to the processor 180 for processing, and sends related uplink data to the base station. Generally, the RF circuit 110 includes, but is not limited to, an antenna, at least one amplifier, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 2600, and the like. In addition, the memory 120 may include a high speed random access memory, and may also include a non-volatile memory such as at least one magnetic disk storage device, a flash memory, or another volatile solid-state storage device. Correspondingly, the memory 120 may further include a memory controller, so as to provide access of the processor 180 and the input unit 130 to the memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which may also be referred to as a touch screen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick The display unit 140 may be configured to display information input by the user or information provided for the user, and various graphical user interfaces of the terminal 2600. The graphical user interfaces may be formed by a graph, a text, an icon, a video, or any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 26, the touch-sensitive surface 131 and the display panel 141 are used as two separate parts to implement input and output functions, in some embodiments, the touch-sensitive surface 131 and the display panel 141 may be integrated to implement the input and output functions.

The terminal 2600 may further include at least one sensor 150, such as an optical sensor, a motion sensor, and other sensors. Specifically, the optical sensor may include an ambient light sensor and a proximity sensor. The ambient light sensor can adjust luminance of the display panel 141 according to brightness of the ambient light. The proximity sensor may switch off the display panel 141 and/or backlight when the terminal 2600 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 2600, are not further described herein.

The audio circuit 160, a loudspeaker 161, and a microphone 162 may provide audio interfaces between the user and the terminal 2600. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 2600.

WiFi is a short distance wireless transmission technology. The terminal 2600 may help, by using the WiFi module 170, the user to receive and send e-mails, browse a webpage, access streaming media, and so on, which provides wireless broadband Internet access for the user. Although FIG. 26 shows the WiFi module 170, it may be understood that the WiFi module is not a necessary component of the terminal 2600, and when required, the WiFi module may be omitted as long as the scope of the essence of the present disclosure is not changed.

The processor 180 is the control center of the terminal 2600, and is connected to various parts of the mobile phone by using various interfaces and lines. By running or executing the software program and/or module stored in the memory 120, and invoking data stored in the memory 120, the processor 180 performs various functions and data processing of the terminal 2600, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that the foregoing modem may also not be integrated into the processor 180.

The terminal 2600 further includes the power supply 190 (such as a battery) for supplying power to the components. Preferably, the power supply may be logically connected to the processor 180 by using a power management system, thereby implementing functions such as charging, discharging and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the terminal 2600 may further include a camera, a Bluetooth module, and the like, which are not further described herein. Specifically, in this embodiment, the display unit of the terminal is a touch screen display, and the terminal further includes a memory and one or more programs. The one or more programs are stored in the memory and configured to be executed by one or more processors. The one or more programs contain instructions used for executing the following instructions:

acquiring interaction information, the interaction information including at least one type of voice information, text information and expression information;
acquiring an interaction effect corresponding to the interaction information, the interaction effect being at least one of a sound effect and a lighting effect;
acquiring effect data according to the interaction information and the interaction effect; and
sending the effect data to the second terminal, the second terminal displaying the effect data.

Assuming that the foregoing is a first possible implementation manner, in a second possible implementation manner provided on the basis of the first possible implementation manner, a memory of the terminal further includes instructions for executing the following operations:

the acquiring interaction information includes:
detecting a sound recording instruction, and displaying a sound recording interface according to the sound recording instruction; and
acquiring voice information input in a sound recording interface, and using the voice information as the acquired interaction information; and
the acquiring effect data according to the interaction information and the interaction effect includes:
processing the voice information according to the interaction effect to obtain the effect data.

In a third possible implementation manner provided on the basis of the first possible implementation manner, the memory of the terminal further includes instructions for executing the following operations:

the acquiring interaction information includes:
detecting a text input instruction, and displaying a text input interface according to the text input instruction; and
acquiring text information input in the text input interface, and using the text information as the acquired interaction information.
the acquiring effect data according to the interaction information and the interaction effect includes:
processing the voice information according to the interaction effect to obtain the effect data.

In a fourth possible implementation manner provided on the basis of the first possible implementation manner, the memory of the terminal further includes instructions for executing the following operations:

the acquiring interaction information includes:
detecting an expression input instruction, and displaying an expression selection interface according to the expression input instruction; and
acquiring selected expression information in an expression interface, and using the selected expression information as the acquired interaction information; and
the acquiring effect data according to the interaction information and the interaction effect includes:
obtaining the effect data according to the selected expression information and the interaction effect.

In a fifth possible implementation manner provided on the basis of any possible implementation manner of the first to fourth possible implementation manners, the memory of the terminal further includes instructions for executing the following operations:

acquiring an interaction effect corresponding to the interaction information, including:
displaying, by the first terminal, an interaction interface, the interaction interface displaying at least one optional interaction effect of a sound effect and a lighting effect; and
detecting a selected interaction effect, and using the selected interaction effect as an interaction effect corresponding to the interaction information, the selected interaction effect being at least one.

In a sixth possible implementation manner provided on the basis of the first possible implementation manner, the memory of the terminal further includes instructions for executing the following operations:

after the sending the effect data to the second terminal, further including:
detecting a use record acquiring instruction, and sending a use record acquiring request to the second terminal according to the use record acquiring instruction; and
receiving a use record that is returned by the second terminal according to use the record acquiring request and is corresponding to the first terminal.

In a seventh possible implementation manner provided on the basis of the first possible implementation manner, the memory of the terminal further includes instructions for executing the following operations:

receiving voice information sent by the second terminal, and playing the voice information.

In an eighth possible implementation manner provided on the basis of the seventh possible implementation manner, the memory of the terminal further includes instructions for executing the following operations:

before the receiving the voice information sent by the second terminal, further including:
receiving a sound recording request sent by the second terminal; and
determining whether to accept the sound recording request; and
returning a sound recording instruction to the second terminal if it is determined to accept the sound recording request; and
the receiving voice information sent by the second terminal includes:
receiving the voice information that is acquired by the second terminal according to the sound recording instruction.

The terminal provided in this embodiment of the present invention acquires interaction information and an interaction effect corresponding to the interaction information, then acquires effect data according to the interaction information and the interaction effect, and sends the effect data to a second terminal, and the second terminal displays the effect data. Only one interacted terminal installed with an interaction program is needed to implement information interaction, the interaction information is at least one type of voice information, text information and expression information, and the interaction effect is at least one of a sound effect and a lighting effect, which enrich information interaction manners.

An embodiment of the present invention further provides a computer readable storage medium, where the computer readable storage medium may be a computer readable storage medium included in a memory of the foregoing embodiments; and may also exist alone, and not be assembled into a computer readable storage medium in a terminal The computer readable storage medium stores one or more programs, the one or more programs are used by one or more processors to execute an information interaction method, the method is applied to a terminal installed with an interaction program, and the terminal is connected to a second terminal installed with a voice player and a lighting device. The method includes:

acquiring, by a first terminal, interaction information, the interaction information including at least one type of voice information, text information and expression information;

acquiring an interaction effect corresponding to the interaction information, the interaction effect being at least one of a sound effect and a lighting effect.

acquiring effect data according to the interaction information and the interaction effect; and sending the effect data to the second terminal, the second terminal displaying the effect data.

Assuming that the foregoing is a first possible implementation manner, in a second possible implementation manner provided on the basis of the first possible implementation manner, a memory of the terminal further includes instructions for executing the following operations:

the acquiring interaction information includes:

detecting a sound recording instruction, and displaying a sound recording interface according to the sound recording instruction; and acquiring voice information input in the sound recording interface, and using the voice information as the acquired interaction information; and the acquiring effect data according to the interaction information and the interaction effect includes:

processing the voice information according to the interaction effect to obtain the effect data.

In a third possible implementation manner provided on the basis of the first possible implementation manner, the memory of the terminal further includes instructions for executing the following operations:

the acquiring interaction information includes:

detecting a text input instruction, and displaying a text input interface according to the text input instruction; and acquiring text information input in the text input interface, and using the text information as the acquired interaction information; and the acquiring effect data according to the interaction information and the interaction effect includes:

processing the voice information according to the interaction effect to obtain the effect data.

In a fourth possible implementation manner provided on the basis of the first possible implementation manner, the memory of the terminal further includes instructions for executing the following operations:

the acquiring interaction information includes:

detecting an expression input instruction, and displaying an expression selection interface according to the expression input instruction; and acquiring selected expression information in the expression interface, and using the selected expression information as the acquired interaction information; and the acquiring effect data according to the interaction information and the interaction effect includes:

obtaining the effect data according to the selected expression information and the interaction effect.

In a fifth possible implementation manner provided on the basis of any possible implementation manner of the first to fourth possible implementation manners, the memory of the terminal further includes instructions for executing the following operations:

acquiring an interaction effect corresponding to the interaction information, including:

displaying, by the first terminal, an interaction interface, the interaction interface displaying at least one optional interaction effect of a sound effect and a lighting effect; and detecting a selected interaction effect, and using the selected interaction effect as an interaction effect corresponding to the interaction information, the selected interaction effect being at least one.

In a sixth possible implementation manner provided on the basis of the first possible implementation manner, the memory of the terminal further includes instructions for executing the following operations:

after the sending the effect data to the second terminal, further including:

detecting a use record acquiring instruction, and sending a use record acquiring request to the second terminal according to the use record acquiring instruction; and receiving a use record that is returned by the second terminal according to use the record acquiring request and is corresponding to the first terminal.

In a seventh possible implementation manner provided on the basis of the first possible implementation manner, the memory of the terminal further includes instructions for executing the following operations:

receiving voice information sent by the second terminal, and playing the voice information.

In an eighth possible implementation manner provided on the basis of the seventh possible implementation manner, the memory of the terminal further includes instructions for executing the following operations:

before the receiving voice information sent by the second terminal, further including:

receiving a sound recording request sent by the second terminal; and determining whether to accept the sound recording request; and returning a sound recording instruction to the second terminal if it is determined to accept the sound recording request; and the receiving voice information sent by the second terminal includes:

receiving the voice information that is acquired by the second terminal according to the sound recording instruction.

By using the computer readable storage medium provided in this embodiment of the present invention, interaction information and an interaction effect corresponding to the interaction information are acquired by using a first terminal, then effect data is acquired according to the interaction information and the interaction effect, the effect data is sent to a second terminal, and the second terminal displays the effect data. Only one interacted terminal installed with an interaction program is needed to implement information interaction, the interaction information is at least one type of voice information, text information and expression information, and the interaction effect is at least one of a sound effect and a lighting effect, which enrich information interaction manners.

An embodiment of the present invention provides a graphic user interface, where the graphic user interface is used on a terminal, the terminal includes a touch screen display, a memory and one or more processors configured to execute one or more programs, the terminal is installed with an interaction program, and the terminal is connected to a second terminal installed with a voice player and a lighting device. The graphic user interface includes:

acquiring an interaction effect corresponding to the interaction information, the interaction effect being at least one of a sound effect and a lighting effect;

acquiring effect data according to the interaction information and the interaction effect; and sending the effect data to the second terminal, the second terminal displaying the effect data.

By using the graphic user interface provided in this embodiment of the present invention, interaction information and an interaction effect corresponding to the interaction information are acquired by using a first terminal, then effect data is acquired according to the interaction information and the interaction effect, the effect data is sent to a second terminal, and the second terminal displays the effect data. Only one interacted terminal installed with an interaction program is needed to implement information interaction, the interaction information is at least one type of voice information, text information and expression information, and the interaction effect is at least one of a sound effect and a lighting effect, which enrich information interaction manners.

Figure 27:
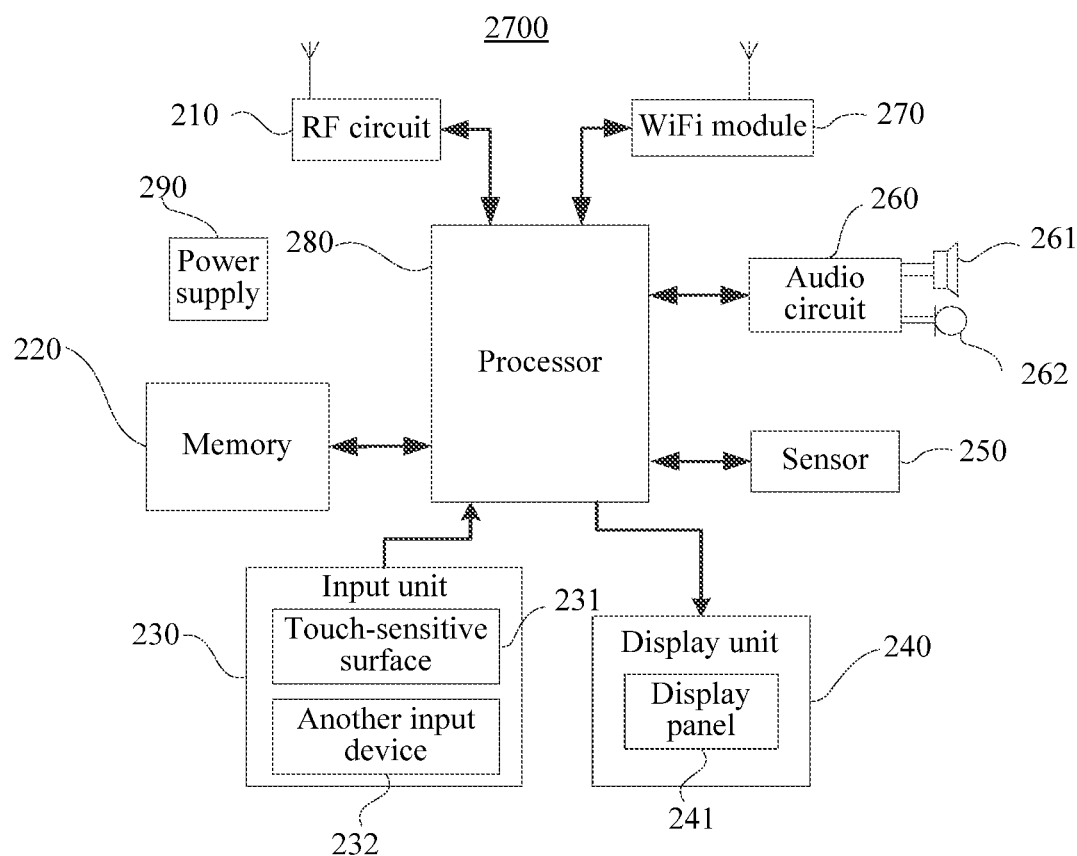
FIG. 27 is a schematic structural diagram of a terminal according to another embodiment of the present invention.

An embodiment of the present invention provides a terminal, where the terminal is installed with a voice player and a lighting device, and the terminal is connected to a first terminal installed with an interaction program. FIG. 27 shows a schematic structural diagram of a terminal involved in this embodiment of the present invention. The terminal may be configured to implement the information interaction method provided in the foregoing embodiments. Specifically:

The terminal 2700 may include components such as an RF circuit 210, a memory 220 including one or more computer readable storage media, an input unit 230, a display unit 240, a sensor 250, an audio circuit 260, a WiFi module 270, a processor 280 including one or more processing cores, and a power supply 290. A person skilled in the art may understand that the structure of the terminal shown in FIG. 27 does not constitute a limitation to the terminal, and the terminal may include more components or fewer components than those shown in the figure, or some components may be combined, or a different component deployment may be used.

The RF circuit 210 may be configured to receive and send signals during an information receiving and sending process or a call process. Particularly, the RF circuit 610 receives downlink information from a base station, then delivers the downlink information to one or more processors 280 for processing, and sends related uplink data to the base station. Generally, the RF circuit 210 includes, but is not limited to, an antenna, at least one amplifier, a tuner, one or more oscillators, a SIM (Subscriber Identity Module) card, a transceiver, a coupler, an LNA, and a duplexer. In addition, the RF circuit 210 may also communicate with a network and another device by wireless communication. The wireless communication may use any communications standard or protocol, which includes, but is not limited to, GSM, GPRS, CDMA, WCDMA, LTE, e-mail, SMS, and the like.

The memory 220 may be configured to store a software program and module. The processor 280 runs the software program and module stored in the memory 220, to implement various functional applications and data processing. The memory 220 may mainly include a program storage area and a data storage area. The program storage area may store an operating system, an application program required by at least one function (such as a sound playback function and an image display function), and the like. The data storage area may store data (such as audio data and an address book) created according to use of the terminal 2700, and the like. In addition, the memory 220 may include a high speed random access memory, and may also include a non-volatile memory such as at least one magnetic disk storage device, a flash memory, or another volatile solid-state storage device. Correspondingly, the memory 220 may further include a memory controller, so as to provide access of the processor 180 and the input unit 230 to the memory 220.

The input unit 230 may be configured to receive input digit or character information, and generate a keyboard, mouse, joystick, optical, or track ball signal input related to the user setting and function control. Specifically, the input unit 230 may include a touch-sensitive surface 231 and another input device 232. The touch-sensitive surface 231, which may also be referred to as a touch screen or a touch panel, may collect a touch operation of a user on or near the touch-sensitive surface (such as an operation of a user on or near the touch-sensitive surface 231 by using any suitable object or accessory, such as a finger or a stylus), and drive a corresponding connection apparatus according to a preset program. Optionally, the touch-sensitive surface 231 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 280. Moreover, the touch controller can receive and execute a command sent from the processor 280. In addition, the touch-sensitive surface 231 may be may be a resistive, capacitive, infrared, or surface sound wave type touch-sensitive surface. In addition to the touch-sensitive surface 231, the input unit 230 may further include the another input device 232. Specifically, the another input device 232 may include, but is not limited to, one or more of a physical keyboard, a functional key (such as a volume control key or a switch key), a track ball, a mouse, and a joystick The display unit 240 may be configured to display information input by the user or information provided for the user, and various graphical user interfaces of the terminal 2700. The graphical user interfaces may be formed by a graph, a text, an icon, a video, or any combination thereof. The display unit 240 may include a display panel 241. Optionally, the display panel 241 may be configured by using an LCD, an OLED, or the like. Further, the touch-sensitive surface 231 may cover the display panel 241. After detecting a touch operation on or near the touch-sensitive surface 231, the touch-sensitive surface 231 transfers the touch operation to the processor 280, so as to determine the type of the touch event. Then, the processor 280 provides a corresponding visual output on the display panel 241 according to the type of the touch event. Although, in FIG. 27, the touch-sensitive surface 231 and the display panel 241 are used as two separate parts to implement input and output functions, in some embodiments, the touch-sensitive surface 231 and the display panel 241 may be integrated to implement the input and output functions.

The terminal 2700 may further include at least one sensor 250, such as an optical sensor, a motion sensor, and other sensors. Specifically, the optical sensor may include an ambient light sensor and a proximity sensor. The ambient light sensor can adjust luminance of the display panel 241 according to brightness of the ambient light. The proximity sensor may switch off the display panel 241 and/or backlight when the terminal 2700 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 2700, are not further described herein.

The audio circuit 260, a loudspeaker 261, and a microphone 262 may provide audio interfaces between the user and the terminal 2700. The audio circuit 260 may convert received audio data into an electric signal and transmit the electric signal to the loudspeaker 261. The loudspeaker 261 converts the electric signal into a sound signal for output. On the other hand, the microphone 262 converts a collected sound signal into an electric signal. The audio circuit 260 receives the electric signal and converts the electric signal into audio data, and outputs the audio data to the processor 280 for processing. Then, the processor 280 sends the audio data to, for example, another terminal by using the RF circuit 210, or outputs the audio data to the memory 220 for further processing. The audio circuit 260 may further include an earplug jack, so as to provide communication between a peripheral earphone and the terminal 2700.

WiFi is a short distance wireless transmission technology. The terminal 2700 may help, by using the WiFi module 270, the user to receive and send e-mails, browse a webpage, access streaming media, and so on, which provides wireless broadband Internet access for the user. Although FIG. 27 shows the WiFi module 270, it may be understood that the WiFi module is not a necessary component of the terminal 2700, and when required, the WiFi module may be omitted as long as the scope of the essence of the present disclosure is not changed.

The processor 280 is the control center of the terminal 2700, and is connected to various parts of the mobile phone by using various interfaces and lines. By running or executing the software program and/or module stored in the memory 220, and invoking data stored in the memory 220, the processor 280 performs various functions and data processing of the terminal 2700, thereby performing overall monitoring on the mobile phone. Optionally, the processor 280 may include one or more processing cores. Preferably, the processor 280 may integrate an application processor and a modem. The application processor mainly processes an operating system, a user interface, an application program, and the like. The modem mainly processes wireless communication. It may be understood that the foregoing modem may also not be integrated into the processor 280.

The terminal 2700 further includes the power supply 290 (such as a battery) for supplying power to the components. Preferably, the power supply may be logically connected to the processor 280 by using a power management system, thereby implementing functions such as charging, discharging and power consumption management by using the power management system. The power supply 290 may further include one or more of a direct current or alternating current power supply, a re-charging system, a power failure detection circuit, a power supply converter or inverter, a power supply state indicator, and any other components.

Although not shown in the figure, the terminal 2700 may further include a camera, a Bluetooth module, and the like, which are not further described herein. Specifically, in this embodiment, the display unit of the terminal is a touch screen display, and the terminal further includes a memory and one or more programs. The one or more programs are stored in the memory and configured to be executed by one or more processors. The one or more programs contain instructions used for executing the following operations.

receiving effect data sent by the first terminal; and
    displaying the effect data.

The effect data is obtained by the first terminal according to the acquired interaction information and the acquired interaction effect. The interaction information includes at least one type of voice information, text information and expression information, the interaction effect is an interaction effect corresponding to the interaction information, and the interaction effect is at least one of a sound effect and a lighting effect.

Assuming that the foregoing is a first possible implementation manner, in a second possible implementation manner provided on the basis of the first possible implementation manner, a memory of the terminal further includes instructions for executing the following operations:

the displaying the effect data includes:
    controlling, according to the effect data, a voice player to play a corresponding sound effect and/or the lighting device to display a corresponding lighting effect.

In a third possible implementation manner provided on the basis of the first possible implementation manner, the memory of the terminal further includes instructions for executing the following operations:

after the displaying the effect data, further including:
    receiving a use record acquiring request sent by the first terminal; and
    searching, according to the use record acquiring request, for a use record corresponding to the first terminal, and returning the use record to the first terminal.

In a fourth possible implementation manner provided on the basis of the first possible implementation manner, the memory of the terminal further includes instructions for executing the following operations:

acquiring voice information, and sending the voice information to the first terminal, the first terminal playing the voice information.

In a fifth possible implementation manner provided on the basis of the fourth possible implementation manner, the memory of the terminal further includes instructions for executing the following operations:

before the acquiring voice information, further including:
detecting a voice acquiring instruction, and sending a sound recording request to the first terminal according to the voice acquiring instruction; and
receiving a sound recording instruction that is returned by the first terminal according to the sound recording request; and
the acquiring voice information includes:
acquiring the voice information according to the sound recording instruction.

The terminal provided in this embodiment of the present invention receives effect data sent by a first terminal, and displays the effect data, and only one interacted terminal installed with an interaction program is needed to implement information interaction. The effect data is obtained by the first terminal according to acquired interaction information and an interaction effect corresponding to the acquired interaction information, the interaction information includes at least one type of voice information, text information and expression information, and the interaction effect is at least one of a sound effect and a lighting effect, which enrich information interaction manners.

An embodiment of the present invention further provides a computer readable storage medium, where the computer readable storage medium may be a computer readable storage medium included in a memory of the foregoing embodiments; and may also exist alone, and not be assembled into a computer readable storage medium in a terminal The computer readable storage medium stores one or more programs, the one or more programs are used by one or more processors to execute an information interaction method, the method is applied to a terminal installed with a voice player and a lighting device, and the terminal is connected to a first terminal installed with an interaction program. The method includes:
receiving effect data sent by a first terminal; and
displaying the effect data.

The effect data is obtained by the first terminal according to the acquired interaction information and the acquired interaction effect. The interaction information includes at least one type of voice information, text information and expression information, the interaction effect is an interaction effect corresponding to the interaction information, and the interaction effect is at least one of a sound effect and a lighting effect.

Assuming that the foregoing is a first possible implementation manner, in a second possible implementation manner provided on the basis of the first possible implementation manner, a memory of the terminal further includes instructions for executing the following operations:
the displaying the effect data includes:
controlling, according to the effect data, the voice player to play a corresponding sound effect and/or the lighting device to display a corresponding lighting effect.

In a third possible implementation manner provided on the basis of the first possible implementation manner, the memory of the terminal further includes instructions for executing the following operations:
after the displaying the effect data, further including:
receiving a use record acquiring request sent by the first terminal; and
searching, according to the use record acquiring request, for a use record corresponding to the first terminal, and returning the use record to the first terminal.

In a fourth possible implementation manner provided on the basis of the first possible implementation manner, the memory of the terminal further includes instructions for executing the following operations:
acquiring voice information, and sending the voice information to the first terminal, the first terminal playing the voice information.

In a fifth possible implementation manner provided on the basis of the fourth possible implementation manner, the memory of the terminal further includes instructions for executing the following operations:
before the acquiring voice information, further including:
detecting a voice acquiring instruction, and sending a sound recording request to the first terminal according to the voice acquiring instruction; and
receiving a sound recording instruction that is returned by the first terminal according to the sound recording request; and
the acquiring voice information includes:
acquiring the voice information according to the sound recording instruction.

By using the computer readable storage medium provided in this embodiment of the present invention, effect data sent by a first terminal is received, and the effect data is displayed, and only one interacted terminal installed with an interaction program is needed to implement information interaction. The effect data is obtained by the first terminal according to acquired interaction information and an interaction effect corresponding to the acquired interaction information, the interaction information includes at least one type of voice information, text information and expression information, and the interaction effect is at least one of a sound effect and a lighting effect, which enrich information interaction manners.

It should be noted that, when the information interaction terminal provided in the foregoing embodiments perform information interaction, only the division of the foregoing functional modules are used as examples for description. In actual application, the foregoing functions may be assigned to different functional module according to requirements for completion, that is, an internal structure of the terminal is divided into different functional modules, to complete all or a part of functions described above. In addition, the information interaction terminal provided in the foregoing embodiment and the embodiment of the information interaction method belong to the same idea, and for details of specific implementation processes thereof, refer to the method embodiments, which are not described again herein.

The sequence numbers of the foregoing embodiments of the present invention are merely for description, but do not represent the advantages and disadvantages of the embodiments.

A person of ordinary skill in the art may understand that all or a part of steps of the foregoing embodiments may be implemented by using hardware, or may be completed by using a program to instruct related hardware, the program may be stored in a computer readable storage medium, and the foregoing mentioned storage medium may be a read-only memory, a magnetic disk, an optical disc, or the like.

The foregoing embodiments are merely preferred embodiments of the present invention, but are not intended to limit the present disclosure. Any modification, equivalent replacement and improvement made without departing from the spirit and principle of the present disclosure shall all fall within the protection scope of the present disclosure.

What is claimed is:

1. An information interaction method, applied to a first terminal installed with an interaction program, the first terminal being connected to a second terminal, and the method comprising:
    acquiring, by the first terminal, interaction information, the interaction information comprising selection of an optical expression, the optical expression comprising a visual aspect to be displayed on the second terminal;
    acquiring an interaction effect corresponding to the interaction information, the interaction effect being a selected lighting effect to apply to a visual appearance of the visual aspect of the optical expression;
    acquiring effect data according to the interaction information and the interaction effect by modifying a visual appearance of the visual aspect of the optical expression with the selected lighting effect;
    sending the effect data to the second terminal for displaying the effect data;
    receiving, by the first terminal from the second terminal, feedback information indicating whether the second terminal successfully displayed the effect data;
    detecting, by the first terminal, a use record acquiring instruction, and sending a use record acquiring request to the second terminal according to the use record acquiring instruction;
    receiving a use record that is returned by the second terminal according to the use record acquiring request and is corresponding to the first terminal,
        wherein the use record comprises information from the second terminal regarding historical interactions with the first terminal including interaction times of the first terminal with the second terminal and a number of times of interactions of the first terminal with the second terminal;
    receiving, by the first terminal from the second terminal, the feedback informatio n indicating that the second terminal did not successfully display the effect data;
    outputting a prompt on the first terminal indicating that the second terminal did not successfully display the effect data;
    detecting that an identifier corresponding to the effect data is selected;
    displaying a resend option on the first terminal;
    receiving a selection of the displayed resend option to resend the effect data to the second terminal for displaying the effect data; and
    resending the effect data to the second terminal for displaying the effect data.

2. The method according to claim 1, wherein the acquiring the interaction effect corresponding to the interaction information comprises:
    displaying, by the first terminal, an interaction interface, the interaction interface displaying a plurality of selectable lighting effects; and
    detecting a selection of the selected lighting effect.

3. An information interaction terminal, the terminal being installed with an interaction program, the terminal being connected to a second terminal, and the terminal comprising:
    a processor and multiple instruction modules executed by the processor, the multiple instruction modules comprising:
    a first acquiring module, configured to acquire interaction information, the interaction information comprising expression information further comprising a selection of an optical expression to be provided to the second terminal, the optical expression comprising a visual aspect to be displayed on the second terminal;
    a second acquiring module, configured to acquire an interaction effect corresponding to the interaction information, the interaction effect being a lighting effect to be applied to the visual aspect of the optical expression;
    a third acquiring module, configured to acquire effect data according to the interaction information and the interaction effect by applying the lighting effect to the visual aspect of the optical expression;
    a first sending module, configured to send the effect data to the second terminal for display on the second terminal;
    a fourth acquiring module, configured to acquire a use record acquiring instruction;
    a second sending module, configured to send a use record acquiring request to the second terminal according to the use record acquiring instruction; and
    a first receiving module, configured to receive a use record that is returned by the second terminal according to the use record acquiring request,
    wherein the use record comprises information from the second terminal regarding historical interactions with the first terminal including interaction times of the first terminal with the second terminal and a number of times of interactions of the first terminal with the second terminal;
    a second receiving module, configured to receive from the second terminal feedback information indicating whether the second terminal successfully displayed the effect data:
    a fifth acquiring module, configured to output a prompt on the first terminal indicating that the second terminal did not successfully display the effect data in response to receiving by the second receiving module the feedback information indicating that the second terminal did not successfully display the effect data, detect that an identifier corresponding to the effect data is selected, display a resend option on the first terminal, and receive a selection of the displayed resend option to resend the effect data to the second terminal for displaying the effect data; and
    wherein the first sending module is configured to resend the effect data to the second terminal for display on the second terminal in response to receiving the instruction to resend the effect data.

4. The terminal according to claim 3, wherein the first acquiring module comprises:
    a third detection unit, configured to detect an expression input instruction;
    a third display unit, configured to display an expression selection interface according to the expression input instruction; and
    a sixth acquiring unit, configured to acquire selected expression information in the expression interface, and use the selected expression information as the acquired interaction information, wherein
    the sixth acquiring module is configured to acquire the effect data according to the selected expression information and the interaction effect.

5. The terminal according to claim 4, wherein the second acquiring module comprises:
    a fourth display unit, configured to display an interaction interface, the interaction interface displaying a plurality of selectable lighting effects; and a fourth detection unit, configured to detect a selection of the selected lighting effect to be applied to the visual aspect of the optical expression.

6. The terminal according to claim 3, wherein the terminal further comprises:
a third receiving module, configured to receive voice information sent by the second terminal; and
a play module, configured to play the voice information.

7. The terminal according to claim 6, wherein the terminal further comprises:
a fourth receiving module, configured to receive a sound recording request sent by the second terminal;
a determining module, configured to determine whether to accept the sound recording request; and
a returning module, configured to return a sound recording instruction to the second terminal when it is determined to accept the sound recording request, wherein the third receiving module, configured to receive voice information that is acquired by the second terminal according to the sound recording instruction.

8. An information interaction method, applied to a first terminal installed with an interaction program, the first terminal being connected to a second terminal, and the method comprising:
acquiring, by the first terminal, interaction information, the interaction information comprising expression information further comprising selection of an optical expression to be provided to the second terminal, the optical expression comprising a visual aspect to be displayed on the second terminal;
acquiring an interaction effect corresponding to the interaction information, the interaction effect being a lighting effect to be applied to the visual aspect of the optical expression;
acquiring effect data according to the interaction information and the interaction effect by applying the lighting effect to the visual aspect of the optical expression;
sending the effect data to the second terminal for displaying the effect data, wherein acquiring the interaction information comprises:
detecting an expression input instruction, and displaying an expression selection interface according to the expression input instruction; and
acquiring selected expression information in the expression interface, and using the selected expression information as the acquired interaction information;
receiving, by the first terminal from the second terminal, feedback information indicating whether the second terminal successfully displayed the effect data;
detecting, by the first terminal, a use record acquiring instruction, and sending a use record acquiring request to the second terminal according to the use record acquiring instruction; and
receiving a use record that is returned by the second terminal according to the use record acquiring request and is corresponding to the first terminal,
wherein the use record comprises information from the second terminal regarding historical interactions with the first terminal including interaction times of the first terminal with the second terminal and a number of times of interactions of the first terminal with the second terminal:,
receiving, by the first terminal from the second terminal, the feedback information indicating that the second terminal did not successfully display the effect data;
outputting a prompt on the first terminal indicating that the second terminal did not successfully display the effect data;
detecting that an identifier corresponding to the effect data is selected;
displaying a resend option on the first terminal;
receiving a selection of the displayed resend option to resend the effect data to the second terminal for displaying the effect data; and
resending the effect data to the second terminal for displaying the effect data.

9. The method according to claim 8, wherein acquiring the interaction effect corresponding to the interaction information comprises:
displaying, by the first terminal, an interaction interface, the interaction interface displaying a plurality of selectable lighting effects; and
detecting a selection of the lighting effect to be applied to the visual aspect of the optical expression.

10. The method according to claim 8, wherein the method further comprises:
receiving voice information sent by the second terminal, and playing the voice information.

11. The method according to claim 10, wherein before receiving the voice information sent by the second terminal, the method further comprises:
receiving a sound recording request sent by the second terminal; and
determining whether to accept the sound recording request; and
returning a sound recording instruction to the second terminal if it is determined to accept the sound recording request; and
wherein receiving the voice information sent by the second terminal comprises:
receiving voice information that is acquired by the second terminal according to the sound recording instruction.

* * * * *